(12) United States Patent
Palanisamy et al.

(10) Patent No.: US 11,476,505 B2
(45) Date of Patent: Oct. 18, 2022

(54) LITHIUM REPLENISHING RECHARGEABLE BATTERIES

(71) Applicants: Manikandan Palanisamy, West Lafayette, IN (US); Mihit Hitendra Parekh, West Lafayette, IN (US); Vilas Ganpat Pol, West Lafayette, IN (US)

(72) Inventors: Manikandan Palanisamy, West Lafayette, IN (US); Mihit Hitendra Parekh, West Lafayette, IN (US); Vilas Ganpat Pol, West Lafayette, IN (US)

( * ) Notice: Subject to any disclaimer, the term of this patent is extended or adjusted under 35 U.S.C. 154(b) by 239 days.

(21) Appl. No.: 16/910,359

(22) Filed: Jun. 24, 2020

(65) Prior Publication Data
US 2021/0013555 A1 Jan. 14, 2021

Related U.S. Application Data

(60) Provisional application No. 62/865,500, filed on Jun. 24, 2019.

(51) Int. Cl.
*H01M 10/44* (2006.01)
*H01M 10/42* (2006.01)
*H01M 4/587* (2010.01)
*H01M 10/0525* (2010.01)
*H01M 4/58* (2010.01)

(52) U.S. Cl.
CPC ....... *H01M 10/4242* (2013.01); *H01M 4/587* (2013.01); *H01M 4/5825* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2008/0050644 A1* | 2/2008 | Christensen | H01M 10/48 429/188 |
| 2016/0006081 A1* | 1/2016 | Eaglesham | H01M 10/058 429/61 |

* cited by examiner

*Primary Examiner* — Stephen W Jackson
(74) *Attorney, Agent, or Firm* — C. John Brannon; Brannon Sowers & Cracraft PC

(57) ABSTRACT

An electrochemical cell, including a first electrode, a first volume of electrolyte in contact with the first electrode, a second volume of electrolyte, a first separator positioned between the first volume and the second volume, a second electrode in contact with the second volume, and a third volume of electrolyte. A second separator is positioned between the second volume and the third volume. A lithium reservoir electrode is in contact with the third volume.

5 Claims, 21 Drawing Sheets

SLLIB - Li vs MCMB vs LiFePO$_4$
SLLIB - Li vs C-Si vs LiNi$_{1/3}$Mn$_{1/3}$Co$_{1/3}$O$_2$

SLLIB – MCMB vs LiFePO$_4$

SLLIB – Li vs MCMB/ C-Si

SLLIB – MCMB/ C-Si vs LiFePO$_4$/LiNi$_{1/3}$Mn$_{1/3}$Co$_{1/3}$O$_2$

LITHIUM REPLENISHING RECHARGEABLE BATTERIES

CROSS-REFERENCE TO RELATED APPLICATIONS

This patent application claims priority to U.S. provisional patent application Ser. No. 62/865,500, filed on Jun. 24, 2019.

TECHNICAL FIELD

The present disclosure relates generally to the field of energy storage and, more particularly, to a long lasting rechargeable storage device.

BACKGROUND

High-energy batteries are attracting attention worldwide due to their applications in electric vehicles (EVs), hybrid electric vehicles (HEVs), grid storage applications, and the like. Presently available lithium-ion batteries (LIBs) are very attractive for sustainable electric transportation as well as a promising alternative for energy storage applications. However, current lithium-ion battery designs suffer from such limitations as short lifetime, being unduly commercially expensive for short-term cycling applications, and instability/safety aspects. Notedly, the straightforward unique requirements for electric vehicles are batteries high-energy density batteries, typically having greater than 240 $Wh/Kg^{-1}$, and the lifetimes of more than 10 years in line with inexpensive and long driving distances. To realize all these points, further developments are urgently required to present lithium-ion battery constituents, particularly in the intercalation-deintercalation reaction and geometric design. Typically, LIB performance depends on intercalation-deintercalation reaction between anode and cathode during charge-discharge cycling. Accordingly for high-energy batteries, the research has been focused on advanced high capacity cathodes, typically greater than 250 mAh $g^{-1}$ (energy density ~1000 Wh $Kg^{-1}$) and developed Li-rich $Li_{1.2}Ni_{0.13}Mn_{0.54}Co_{0.13}O_2$, $Li_{1.2}Ni_{0.2}Mn_{0.6}O_2$, $Li_{1.2}Ni_{0.15}Co_{0.1}Mn_{0.55}O_2$, $Li_2Mn_{2/3}Nb_{1/3}O_2F$, $Li_2Mn_{1/2}Ti_{1/2}O_2F$, $Li_3IrO_4$, Li-rich anti-fluorite $Li_5FeO_4$, Li-free monoxides LiF-MO, multi-shelled metal oxides $V_2O_5$, and high-rate $Nb_{18}W_{16}O_{93}$ materials. Accordingly, lithium-rich materials open a pathway for an advanced high energy density cathode for LIBs.

Of note, the best case thus far is surface coated Ni-rich $Li_{1.2}Ni_{0.76}Mn_{0.14}Co_{0.10}O_2$ cathode delivering high capacities 215 mAh $g^{-1}$ for half-cell with lithium metal and 160 mAh $g^{-1}$ for full-cell with graphite anode, which is 25% less capacity than the Ni-rich half-cell capacity 215 mAh $g^{-1}$. Likewise, one of the potentially stable LIB is graphite vs $LiFePO_4$, assembled using olivine $LiFePO_4$ cathode and graphite anode. This LIB shows the theoretical and practical capacity of 169/~160 mAh $g^{-1}$ related to the olivine $LiFePO_4$ cathode as a $Li^+$ ion source electrode, with other remarkable additional advantages such as low cost, zero-strain, stable voltage profile, long-term cycling, thermal and potential stability. Nevertheless, the full-cell capacity of $LiFePO_4$ vs graphite is always less than the practical half-cell capacity of 160 mAh $g^{-1}$, due to the formation of the solid-electrolyte interface (SEI) on the graphitic surface. For successful implementation of LIBs in EVs applications, the research and development efforts have focused on large-scale geometry for LIBs with systematic cell processing steps, comprising (i) mass balancing with respect to specific capacity between $LiFePO_4$ and graphite, (ii) assembling, (iii) aging, (iv) formation cycles for stabilized rated cell capacity and (v) charge-discharge cycling. Though, before intercalation of $Li^+$ ions into graphite the electrolyte decomposition occurs on the graphitic surface with consumption of $Li^+$ ions from the cathode source, leading to the formation of a solid-electrolyte interface (SEI) passivation film. The SEI film acts as an electronic insulator and allowing $Li^+$ ions during intercalation/de-intercalation process in cell reaction. The SEI film contains multiple layers, specifically an inner-layer of insoluble inorganic compounds LiF, $Li_2CO_3$, $Li_2O$ and an outer layer of less stable organic and polymeric compounds such as ROCOOLi, ROLi and polycarbonates. Thus, SEI formation depletes $LiFePO_4$ capacities and energy densities. After formation, cycling the stabilized rated cell capacity (mAh) and energy densities of Li-ion full-cells always shows less (25-35%) than their theoretical total full-cell capacity and energy densities. Therefore, there remains a need to increase the energy density of LIBs. The present invention addresses this need.

SUMMARY

Synchronized lithium and lithium-ion battery (SLLIB) in situ lithium replenishing full-cell empowered rechargeable batteries are produced by adding reservoir-electrode in standard Li-ion full-cell, and may be assembled using a lithium-compound (such as $LiFePO_4$ and $LiNi_{1/3}Mn_{1/3}Co_{1/3}O_2$) cathode and an anode (such as graphite, mesocarbon microbead (MCMB), Si—C, and the like). The reservoir-electrode behaves as a booster-electrode, replenishing formation cycle $Li^+$ ion loss, due to solid-electrolyte interface (SEI) formation and other electrolyte reaction during formation cycles. Accordingly, the irreversible capacity compensation provided by $Li^+$ ion reservoir yields a renewed flat-voltage profile at 3.3/3.2 V and preserves electrode characteristics of 144 mAh $g^{-1}$ for $LiFePO_4$ (390 mAh $g^{-1}$ for MCMB) in Li-ion full-cell (MCMB vs $LiFePO_4$) cycling. Subsequently, the energy reduced cells during cycling, are boosted and achieved increased energy density with retained flat-voltage profile through $Li^+$ ion boosting from the reservoir-electrode to the MCMB anode by reservoir replenishment process. Further, reservoir reserve mode yielded the charge-discharge capacities of 126/124 mAh $g^{-1}$ at 0.2 C rate, corresponding to $Li^+$ ion transport from reservoir-electrode to $LiFePO_4$ cathode, which was confirmed by the $Li^+$ ion diffusion path through the MCMB electrode. Ultimately, the in situ reservoir-replenishment, replenished cycling and reserve mode cycling processes of the SLLIB approach long lasting rechargeable batteries with the stable charge-discharge cycling and enhanced capacity retention. Therefore, the novel reservoir-electrode in-situ lithium replenishing rechargeable batteries enjoy superior performance over traditional rechargeable lithium ion batteries.

DETAILED DESCRIPTION

Figure 1A:
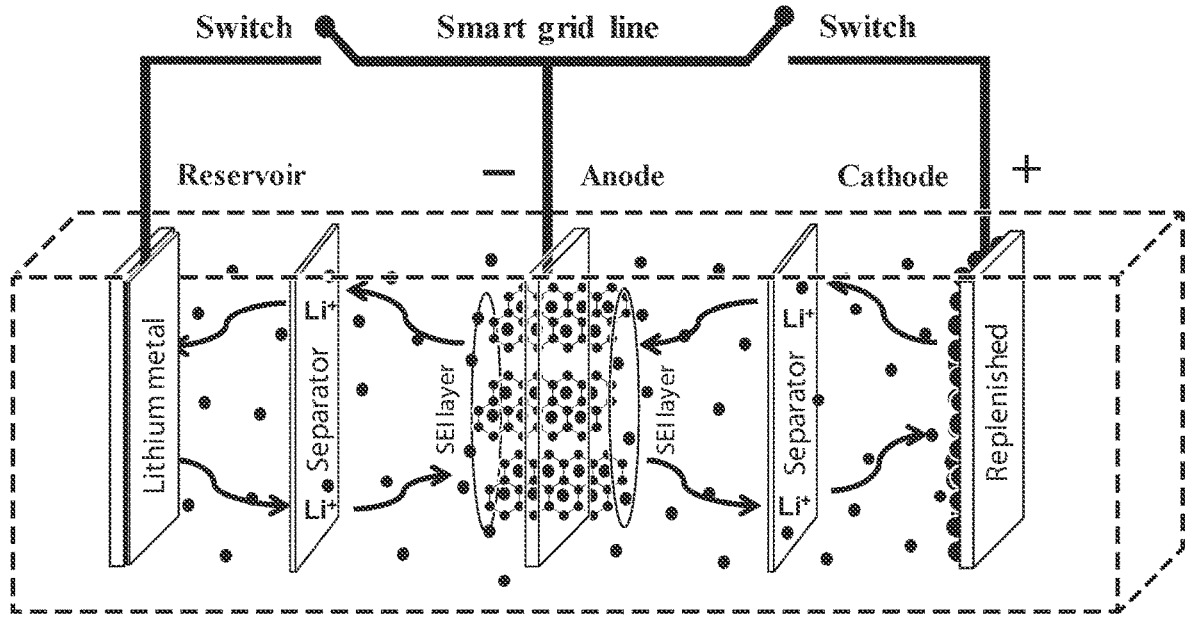
FIG. 1A is a schematic illustration of a synchronized lithium and lithium-ion battery first embodiment of the present novel technology.
Figure 1B:
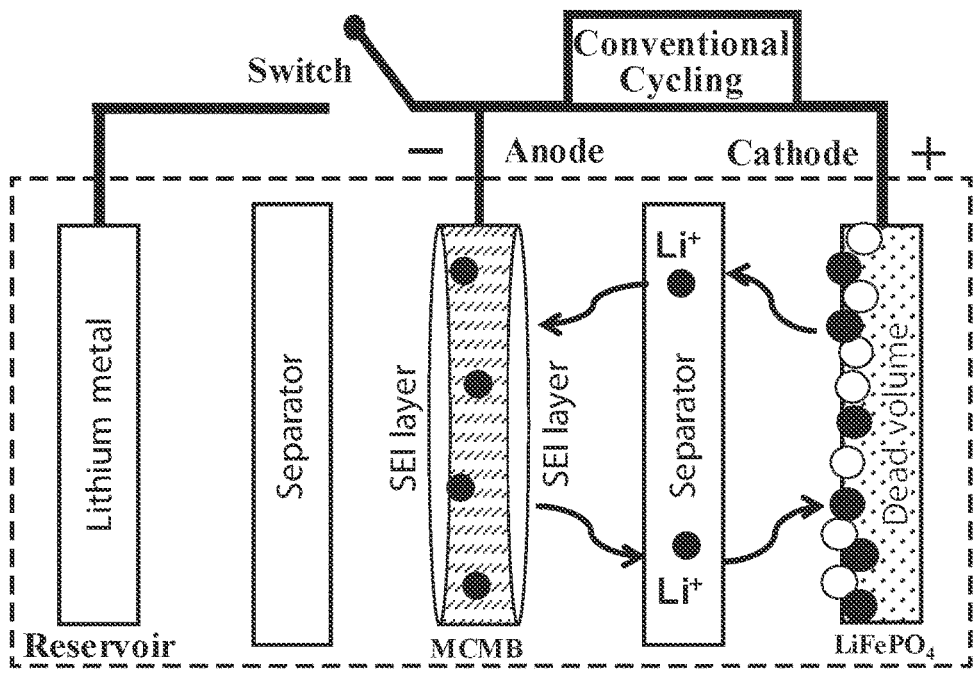
FIG. 1B is a schematic illustration of the conventional cycling process of the synchronized lithium and lithium-ion battery.

For the purposes of promoting an understanding of the principles of the invention and presenting its currently understood best mode process of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

To address the issue of Li$^+$ ion consumption, different strategies have been explored such as loading excess cathode mass to provide 15-20% additional cathode capacity, providing a cathode having lithium additives, chemically blended cathodes, and pre-lithiation of graphite and film forming additives. All these cathode approaches contributed to changes in cell and electrode characteristics, particularly cell voltage, due to the presence of voids in an active LiFePO$_4$ cathode, while pre-lithiation of graphite compensates completely the initial lithium consumption. Nevertheless, pre-lithiation process is one of the special techniques connected with complicated expensive process, which is not plausible for use in the large-scale applications. Indeed, there has been no known technique to achieve 100% specific full-cell capacity and energy density for lithium-ion battery full-cell, all of the above enumerated approve approaches have been enabled to minimize the irreversible capacity loss. Furthermore, continuous capacity fade in Li-ion full-cell, due to $Li^+$ ion loss from the cathode and electrolyte, typically depletes LIBs as energy exhausted cells within 2-3 years. Hence, the enhancement of the lifetimes of current LIBs is most important for long-term EV applications by developing new strategies. Accordingly, the development of longer-lasting rechargeable batteries has enormous scope for EVs, HEVs and high-energy grid storage applications with extended lifetimes.

As shown in FIGS. 1A-12, the present novel technology relates to a in-situ lithium replenishing of synchronized lithium and lithium-ion battery, 10, including a first anode electrode, 15, a second, spaced cathode electrode 20, and a reservoir-electrode 25, which acts as a booster for replenishing cycle $Li^+$ ions consumed during SEI formation while also countering the energy reduction of the cell 10 due to capacity fading in cycle-sequence. The electrodes are immersed in an electrolyte 30 with a first separator 35 between the first and second electrodes 15, 20, and a second separator 40 between the first and third electrodes 15, 25. A first switch 45 is connected in electric communication between the first and third electrodes 15, 25, and a second switch 50 is connected in electric communication between the first and second electrodes 15, 20.

The replenished MCMB vs $LiFePO_4$ full-cell delivered the specific charge-discharge capacities of 147/145 mAh $g^{-1}$ with renewed flat-voltage profiles at 3.3/3.2 V at 0.2 C and high-energy density 455 Wh/Kg. Eventually, reservoir replenishment and replenished cycling processes enable enhancement of cell capacity and energy densities for synchronized lithium and lithium-ion batteries with extended battery lifetimes approaching long lasting rechargeable batteries.

Synchronized Lithium and Lithium-Ion Battery Design

Figure 1C:
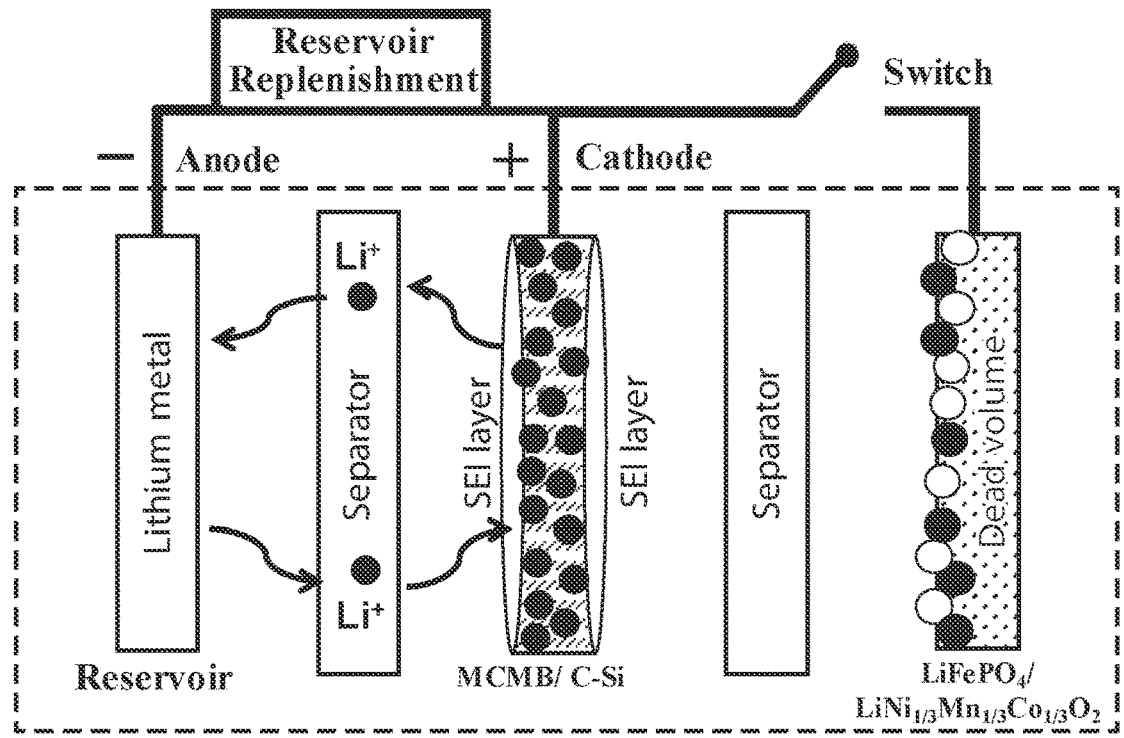
FIG. 1C is a schematic illustration of the reservoir replenishment process of the synchronized lithium and lithium-ion battery.
Figure 1D:
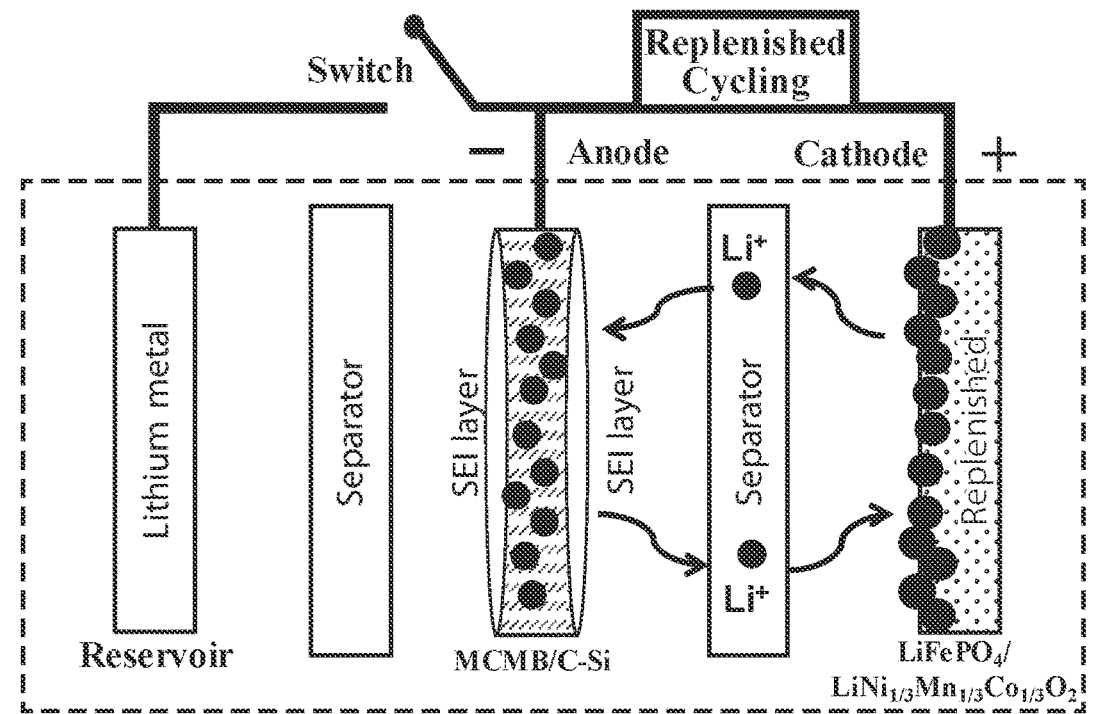
FIG. 1D is a schematic illustration of the replenished cycling process of the synchronized lithium and lithium-ion battery.
Figure 2A:
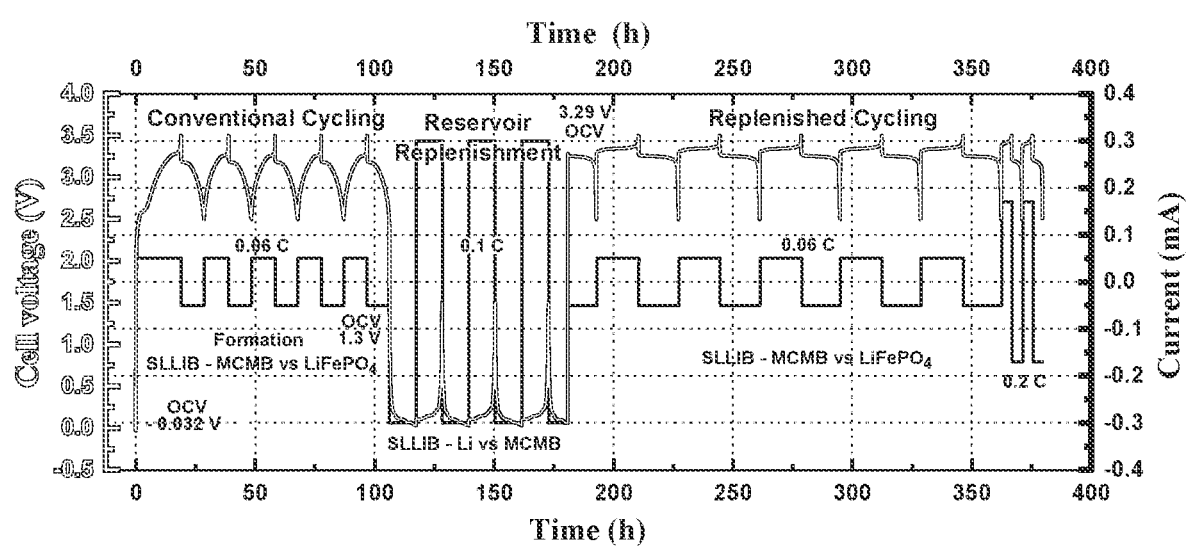
FIG. 2A graphically illustrates cell voltage vs. time for a synchronized lithium and lithium-ion battery operated sequentially in the conventional cycling, reservoir replenishment, and replenished cycling operations.
Figure 2B:
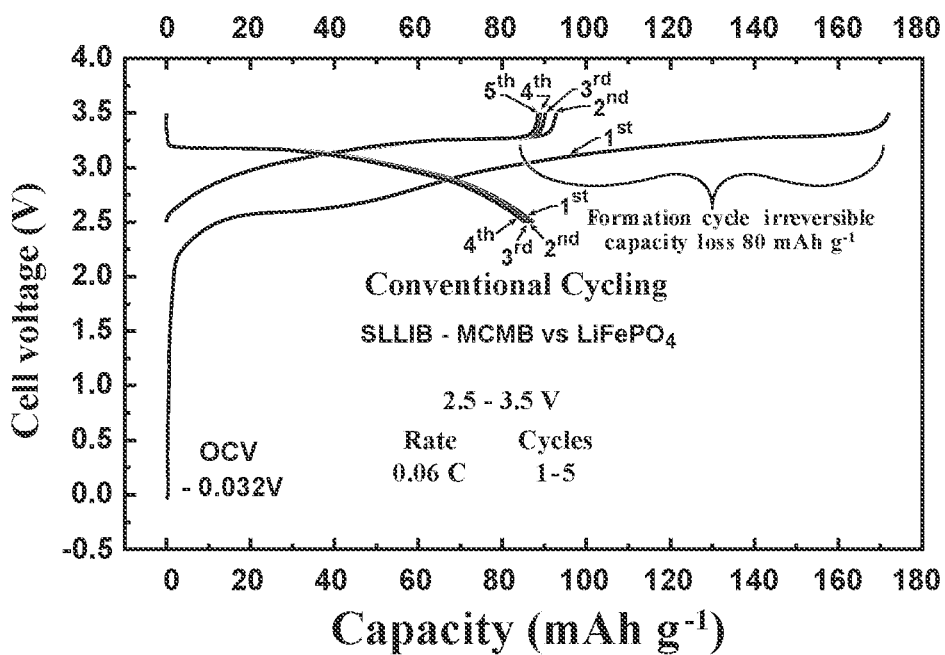
FIG. 2B graphically illustrates cell voltage vs. capacity for a synchronized lithium and lithium-ion battery operated in the conventional cycling process.
Figure 2C:
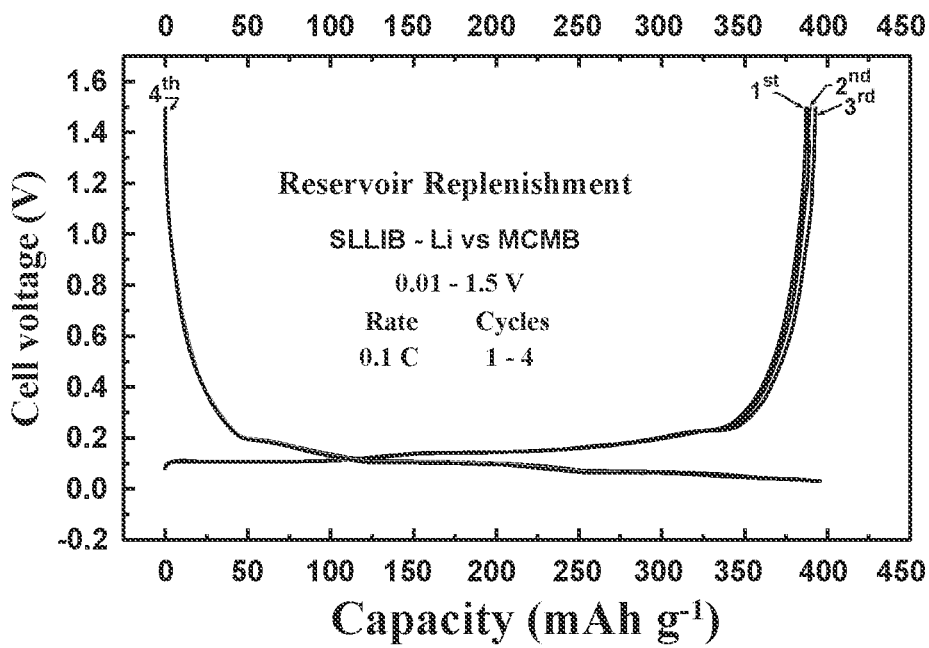
FIG. 2C graphically illustrates cell voltage vs. capacity for a synchronized lithium and lithium-ion battery operated in the reservoir replenishment process.
Figure 2D:
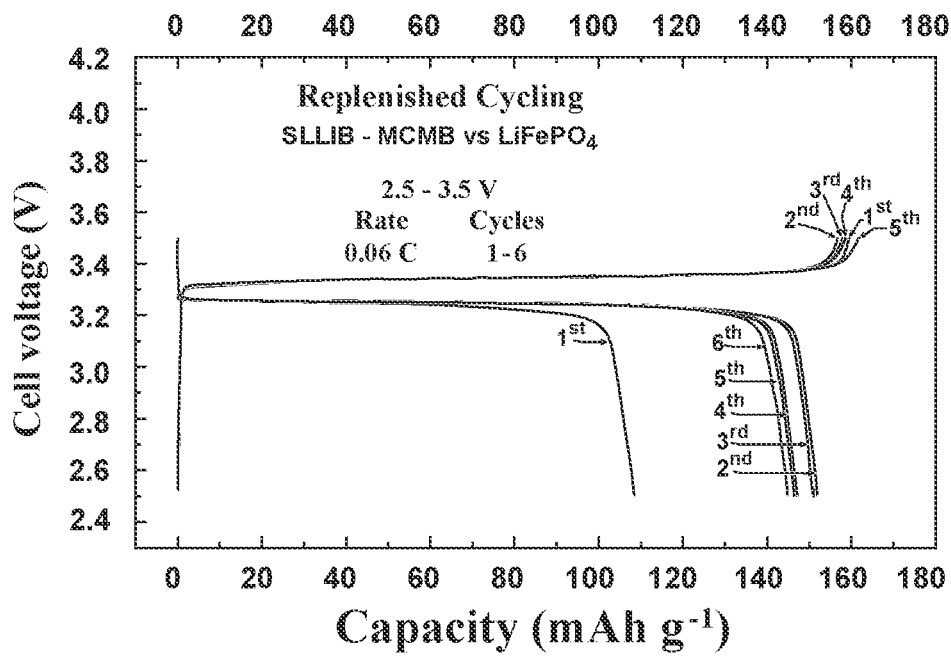
FIG. 2D graphically illustrates cell voltage vs. capacity for a synchronized lithium and lithium-ion battery operated in the replenished cycling process.
Figure 2E:
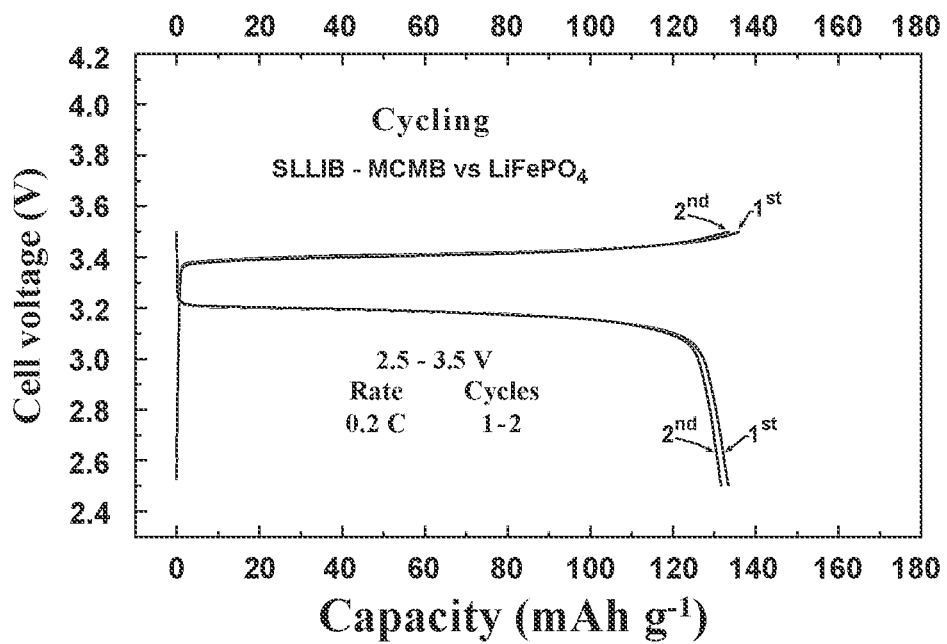
FIG. 2E graphically illustrates cell voltage vs. capacity for a synchronized lithium and lithium-ion battery operated cyclically.

The synchronized lithium and lithium-ion battery geometry acts as a superseding configuration for LIBs and allows advancement towards EVs and high-power train transportation as schematized in FIGS. 1A-1D. Employing the instant synchronized lithium and lithium-ion battery configuration, in situ reservoir replenishment, and replenished cycling processes can be significantly improved battery lifetimes with an enhanced performance, particularly the specific full-cell capacity and energy densities. Thus, the ideal synchronized lithium and lithium-ion battery configuration as described in FIG. 1A, illustrate different mode operations such as conventional cycling (FIG. 1B), reservoir replenishment (FIG. 1C) and replenished cycling (FIG. 1D), executed by smart-grid line and switches connected externally. As schematized in FIG. 1A, the synchronized lithium and lithium-ion battery contains $LiFePO_4$ cathode, MCMB anode, and thin lithium metal foil used as a lithium reservoir-electrode. These electrodes are connected via smart-grid line with switches to enjoy systematic cycling processes without external short-circuit. Significantly, the fabricated MCMB anode has the tendency of $Li^+$ ion penetration from the reservoir-electrode to $LiFePO_4$ cathode. With this outline, the synchronized lithium and lithium-ion battery may exhibit the conventional cycling charge-discharge process between MCMB vs $LiFePO_4$ as given in FIG. 1B. During formation and stabilization cycles, an SEI passivation film formed and covered on the MCMB anode surface, simultaneously the $Li^+$ ion loss occurred in $LiFePO_4$ active particles and presented with (filled) and without $Li^+$ ion (voids). As a result, the decreased $Li^+$ ion concentration depleting $LiFePO_4$ specific capacity with changes of cell voltage and introducing the term of rated cell capacity as 1 C (cell capacity determined in mAh). The synchronized lithium and lithium-ion battery operation changed to reservoir replenishment discharge-charge process between reservoir-electrode and MCMB as shown in FIG. 1C. The formation cycle $Li^+$ ion loss can be completely compensated for by replenishment cycling charge-discharge process between MCMB anode and $LiFePO_4$ cathode, as given in FIG. 1D. Such a reservoir replenishment process for lost $Li^+$ ions was carried out without any other additional steps involved to recover 100% specific full-cell capacity and energy density of $LiFePO_4$ using the synchronized lithium and lithium-ion battery configuration Reservoir Replenishment for Formation Cycles $Li^+$ Ion Loss For the successful implementation of the novel automatic reservoir replenishment process to negate the effects of cycle $Li^+$ ion loss in LIBs, MCMB and $LiFePO_4$ materials are used in this example and characterized by powder X-ray diffraction pattern. All the diffraction peaks of MCMB and $LiFePO_4$ could be well indexed with standard patterns and confirmed that no other impurity phase presented along with major phase. Consequently, the elemental mapping and energy dispersive X-ray (EDX) spectrum of MCMB shows that presence of C without any other elements, while $LiFePO_4$ reveals presence of pronounced Fe, P and O elements. Then, the electrode materials exhibit polyhedral morphology with the average particle size in the range 3-5 μm for MCMB and 200-500 nm for $LiFePO_4$. With this physical structural confirmation, the $LiFePO_4$ and MCMB electrodes have been fabricated and assembled synchronized lithium and lithium-ion battery, exhibiting OCV of −0.032 V as depicted in FIGS. 2A-B. The complete in situ replenishment process, preceded by conventional cycling (SLLIB-MCMB vs $LiFePO_4$), reservoir replenishment (SLLIB-Li vs MCMB) and the replenished cycling (SLLIB-MCMB vs $LiFePO_4$) cycling processes are shown in FIG. 2A. The initial formation cycles were carried out with conventional cycling between MCMB vs $LiFePO_4$ at 0.06 C rate (0.05 mA, blue) for 5 cycles as shown in FIG. 2A. From the Mode-1 results, the first formation cycle charge-discharge capacities are 172/87 mAh $g^{-1}$ and its charge plateau comprising two kinds of slope-voltage profile (FIGS. 2A-B); specifically the initial slope-voltage region occurred below 2.5 V and was attributed to SEI formation and region between 2.8 to 3.5 V corresponding to electrochemically active $Fe^{2+}$ redox species. The first formation cycle irreversible capacity loss was around 80 mAh $g^{-1}$, which is almost 47% specific capacity loss for $LiFePO_4$ (with respect to theoretical capacity 169 mAh $g^{-1}$) as shown in FIG. 2B. The irreversible capacity loss was almost equal to the conventional full-cell irreversible capacity loss 67 mAh $g^{-1}$, assembled with MCMB vs $LiFePO_4$.

Figure 6A:
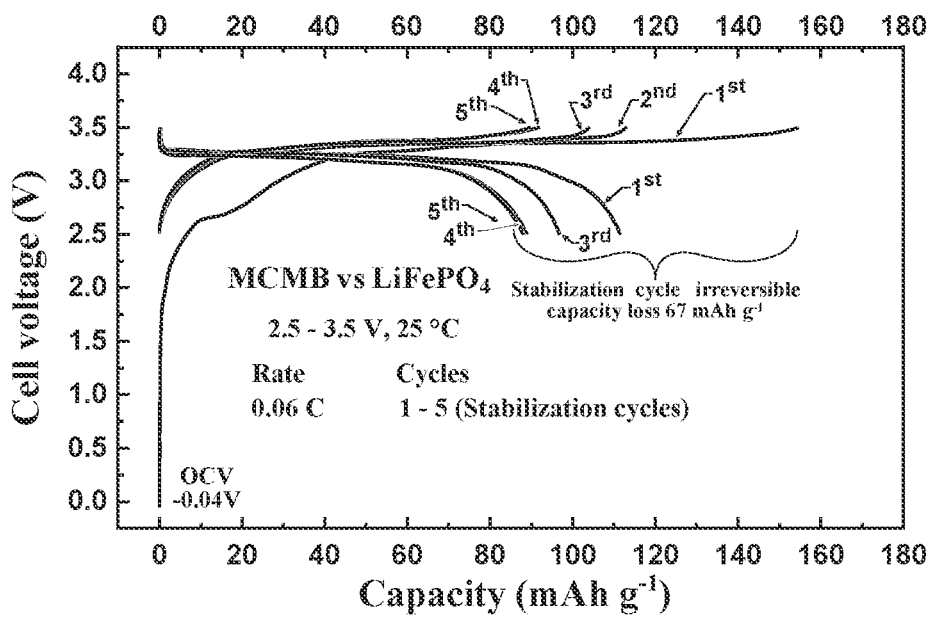
FIG. 6A graphically illustrates cell voltage vs. capacity over the first five stabilization cycles for MCMB vs. LiFePO$_4$.
Figure 6B:
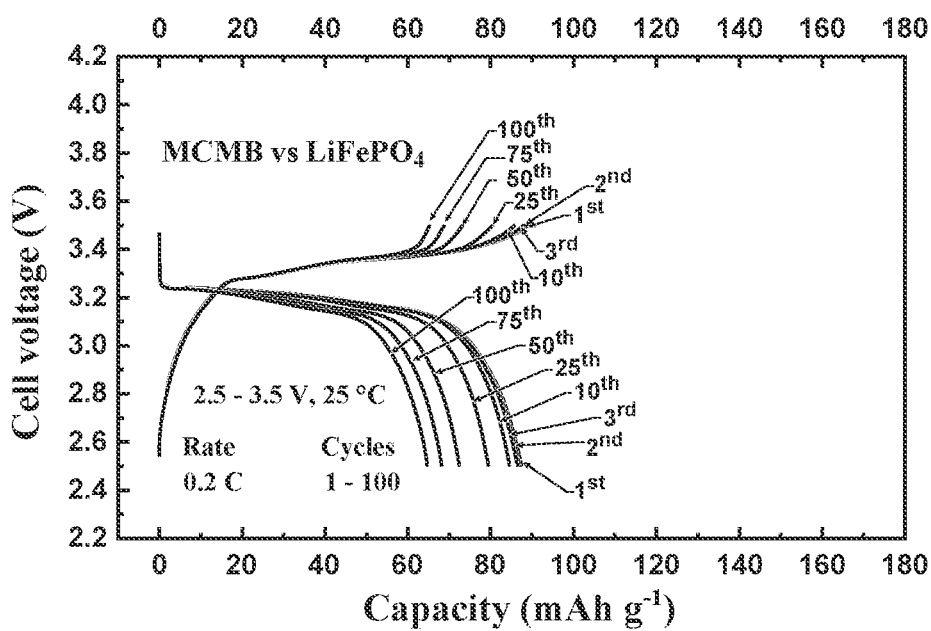
FIG. 6B graphically illustrates cell voltage vs. capacity over the first 100 cycles for MCMB vs. LiFePO$_4$.
Figure 7A:
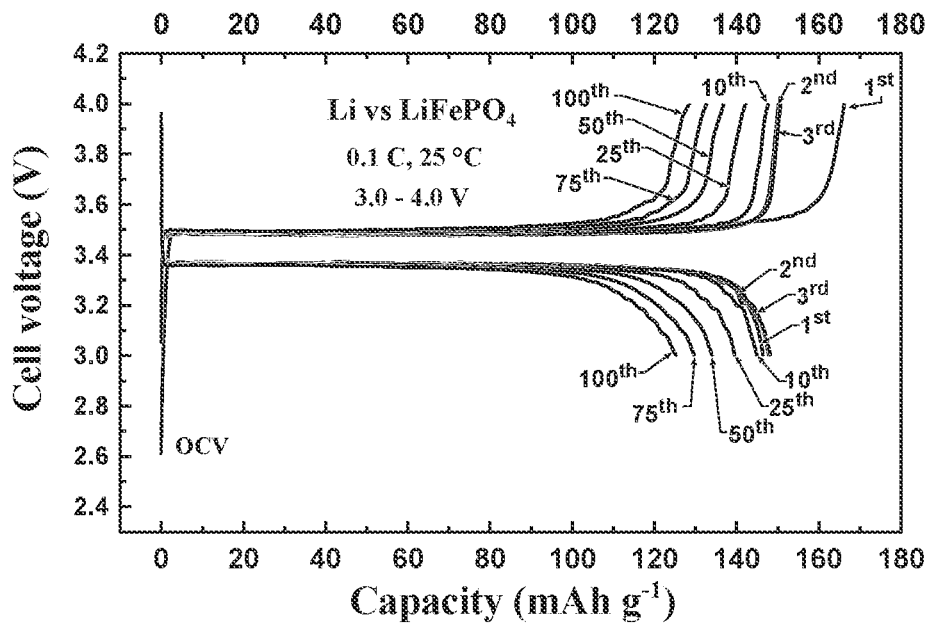
FIG. 7A graphically illustrates cell voltage vs. capacity over the first 100 cycles for Li vs. LiFePO$_4$.
Figure 7B:
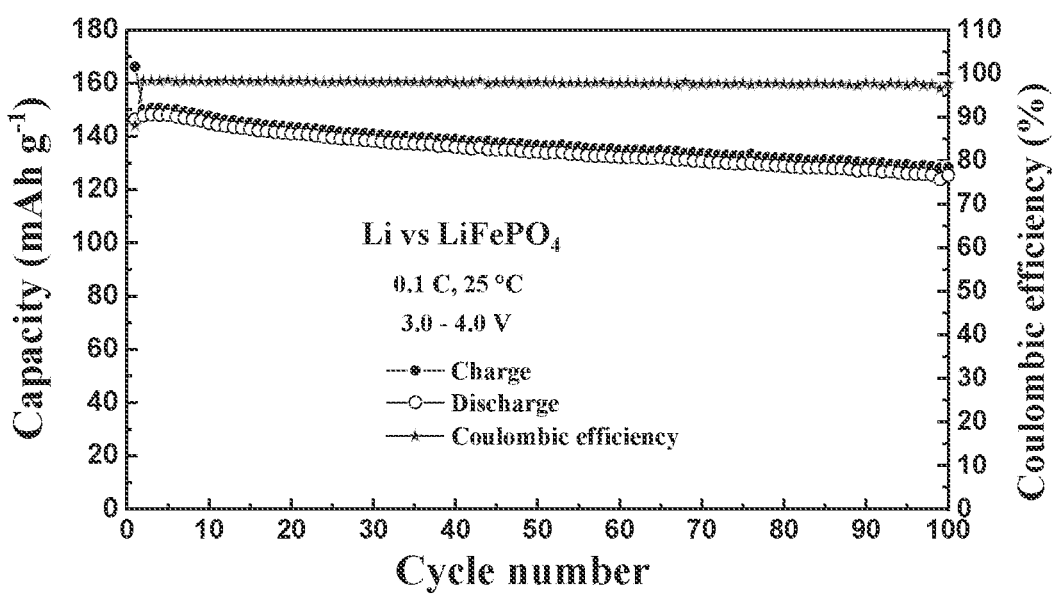
FIG. 7B graphically illustrates capacity vs. cycle number over the first 100 cycles for Li vs. LiFePO$_4$.
Figure 8A:
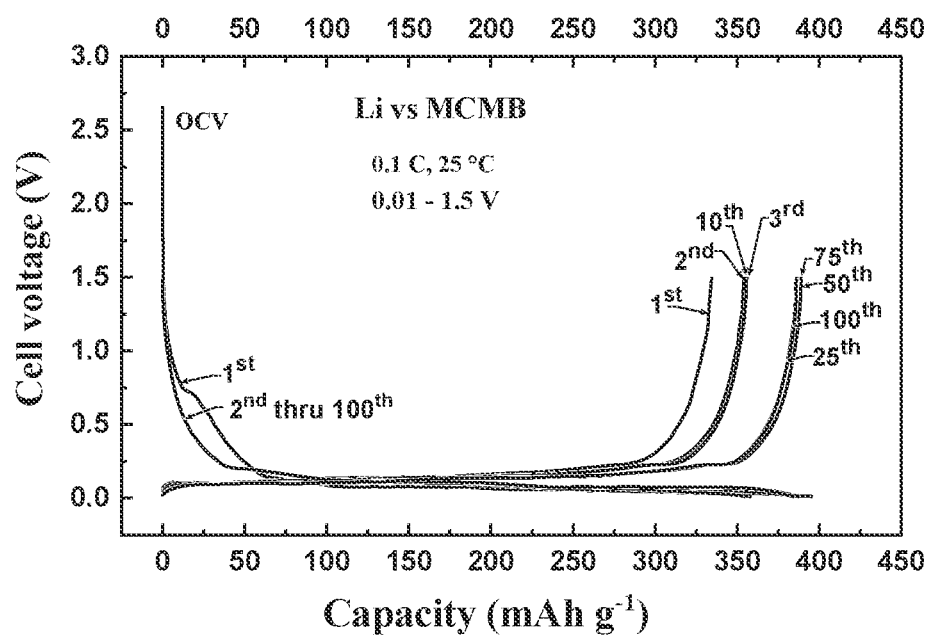
FIG. 8A graphically illustrates cell voltage vs. capacity over the first 100 cycles for Li vs. MCMB.
Figure 8B:
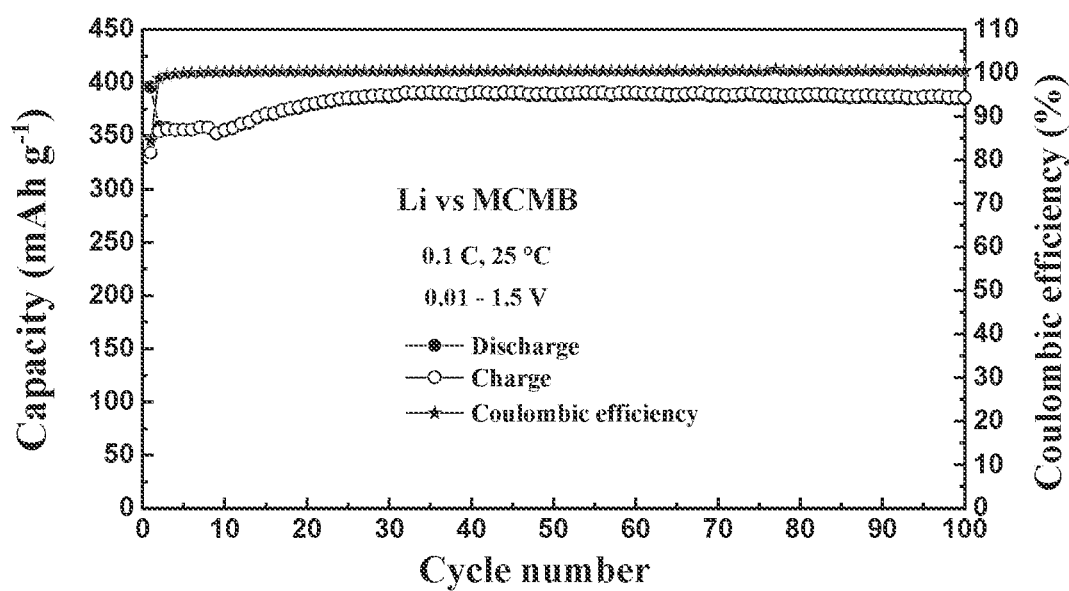
FIG. 8B graphically illustrates capacity vs. cycle number over the first 100 cycles for Li vs. MCMB.

The slightly excess irreversible capacity loss in synchronized lithium and lithium-ion battery can be associated with the double-sided SEI formation related to more $Li^+$ ion consumption as the MCMB electrode has a the tendency for $Li^+$ ion penetration through the electrode to both the reservoir-electrode and the $LiFePO_4$ cathode. From the second cycle onward, the synchronized lithium and lithium-ion battery charge-discharge capacity of 90/85 mAh $g^{-1}$ (2.5-3.5 V) was quite stable and typically matching with the stabilized charge-discharge capacity 91/88 mAh $g^{-1}$ of conventional full-cell at 0.06 C (see FIGS. 6A and 6B). Also, the obtained slope-voltage profiles of the synchronized and conventional full-cells are completely different from the flat-voltage profile of $LiFePO_4$ cathode for the reason of that reduced $Li^+$ ion concentration with the presence of voids active particles at fully discharged state as shown in FIGS. 2B and 6A related to proposed schematic in FIG. 1C.

In principle, decreased $Li^+$ ion concentration has been associated with slope-voltage profile and unbalanced energy gradient between $LiFePO_4$ and MCMB electrodes. Further, after formation cycles the stabilized charge-discharge capacities 90/85 mAh $g^{-1}$ (rated capacity in mAh) at 0.06 C less than $LiFePO_4$ half-cell cycling charge-discharge capacities 150/148 mAh $g^{-1}$ (0.1 C, 3-4 V) as given in FIG. 7A-7F. Hence, after 5 cycles (conventional cycling of synchronized cell) the cycling process changed to reservoir replenishment operation between reservoir-electrode and MCMB at 0.1 C (0.300 mA) with measured OCV of 1.3 V and delivered stable discharge-charge capacities 396/392 mAh $g^{-1}$ (1-3 cycles in FIG. 2B). The obtained results were exactly corroborated with the Li vs MCMB half-cell results, discharge-charge capacities 390/388 mAh $g^{-1}$ ($75^{th}$ cycle) at 0.1 C between 0.01-1.5 V as given in FIG. 8A-8B. Importantly, $4^{th}$ cycle discharge step (reservoir replenishment) was limited at 289 mAh $g^{-1}$ to avoid complete $Li^+$ ion intercalation into the MCMB anode. At this stage, the MCMB anode has been filled with more than required $Li^+$ ions for the void's active particles, presented in $LiFePO_4$ cathode. Accordingly, the synchronized cell operation was switched to replenished cycling process between MCMB vs $LiFePO_4$ at 0.06 C rate (0.05 mA) for 1-6 cycles (sixth discharge only) with measured the OCV of 3.29 V. In replenished cycling, the synchronized lithium and lithium-ion battery delivered the charge-discharge capacities 157/152 mAh $g^{-1}$ (second cycle, 0.06C, 2.5-3.5 V) with a renewed flat-voltage profile and was almost equal to the $LiFePO_4$ half-cell cycling charge-discharge capacities of 150/148 mAh $g^{-1}$ at 0.1 C between 3-4 V. Further, the rate of the replenished cycling process increased to 0.2 C and yielded charge-discharge capacities of 136/133 mAh $g^{-1}$ in between 2.5-3.5 V with stable flat-voltage profile. From these results, the in situ reservoir-replenishment process was observed to complete compensate for $Li^+$ ion loss, consumed to SEI formation, and almost 100% specific full-cell capacity of $LiFePO_4$ cathode recovered, in lined with MCMB anode.

Figure 3A:
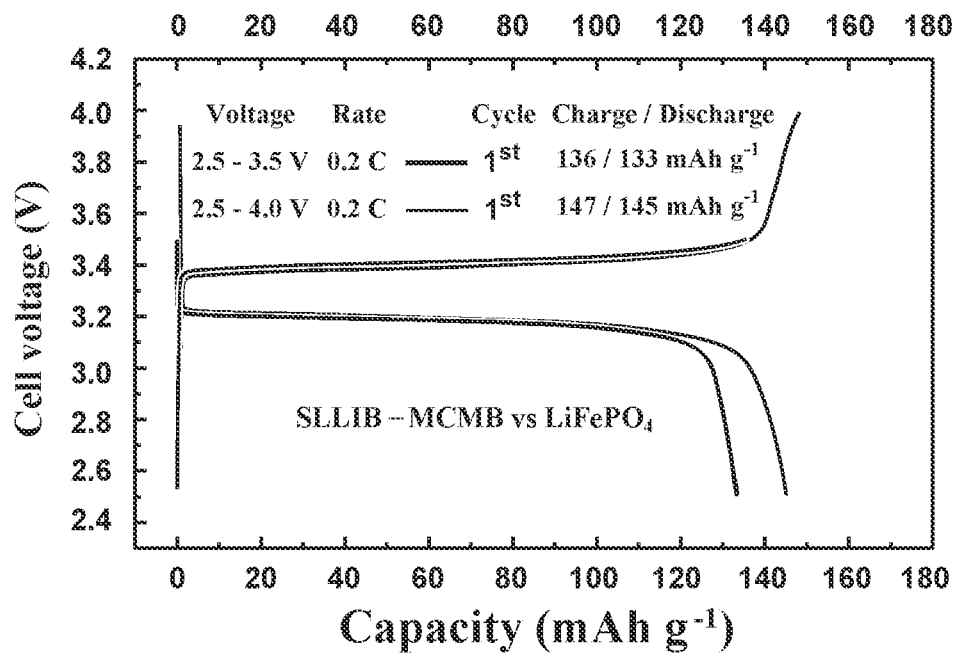
FIG. 3A graphically illustrates cell voltage vs. capacity for a synchronized lithium and lithium-ion battery operated at various voltages.
Figure 3B:
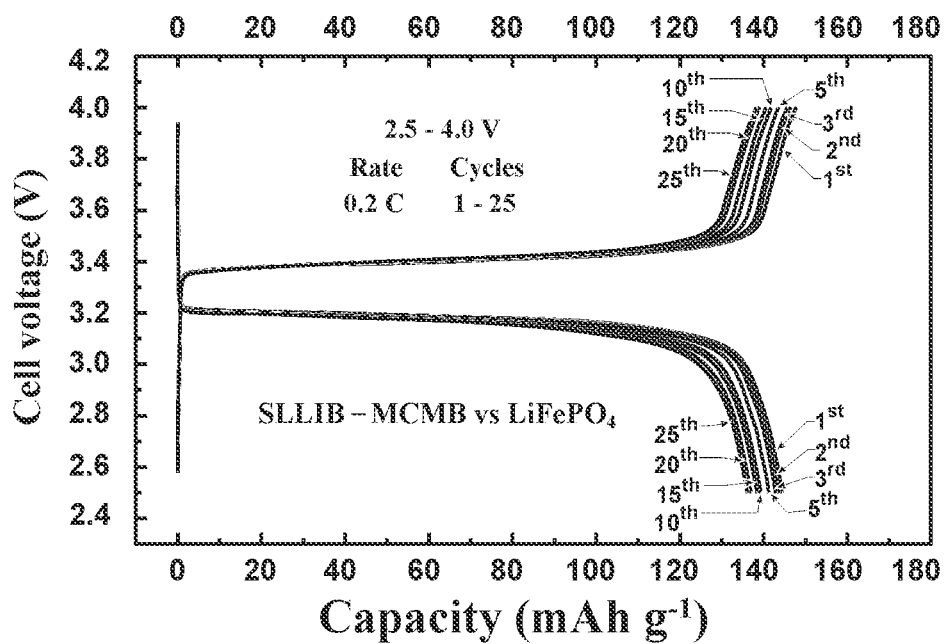
FIG. 3B graphically illustrates cell voltage vs. capacity for a synchronized lithium and lithium-ion battery operated at various cycles.
Figure 3C:
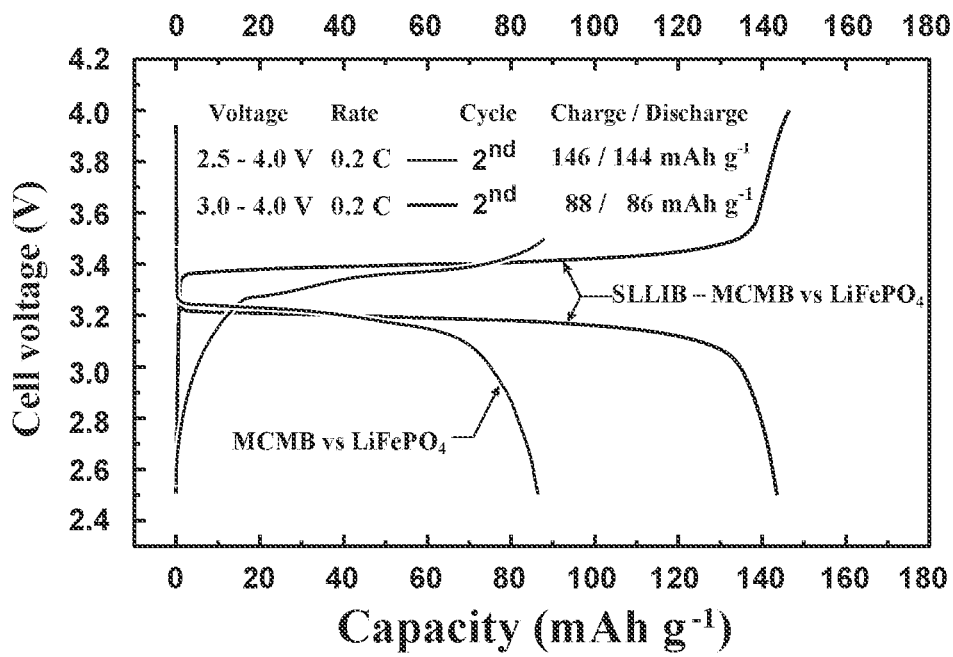
FIG. 3C graphically illustrates cell voltage vs. capacity for a synchronized lithium and lithium-ion battery, and the conventional full-cell operated at various voltages.
Figure 3D:
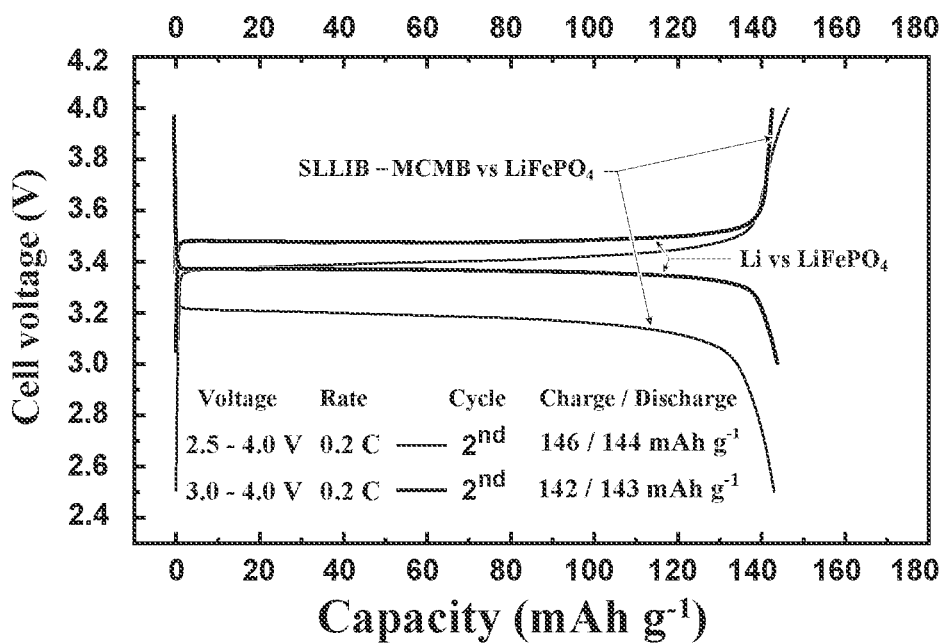
FIG. 3D graphically illustrates cell voltage vs. capacity for a synchronized lithium and lithium-ion battery, and half-cell operated at various voltages.
Figure 3E:
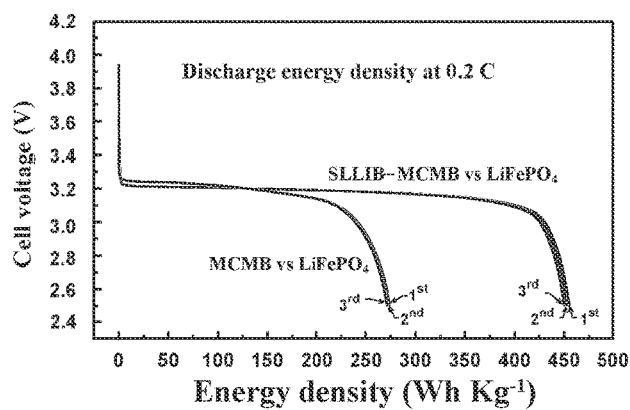
FIG. 3E graphically illustrates cell voltage vs. energy density for a synchronized lithium and lithium-ion battery, and the conventional full-cell.
Figure 3F:
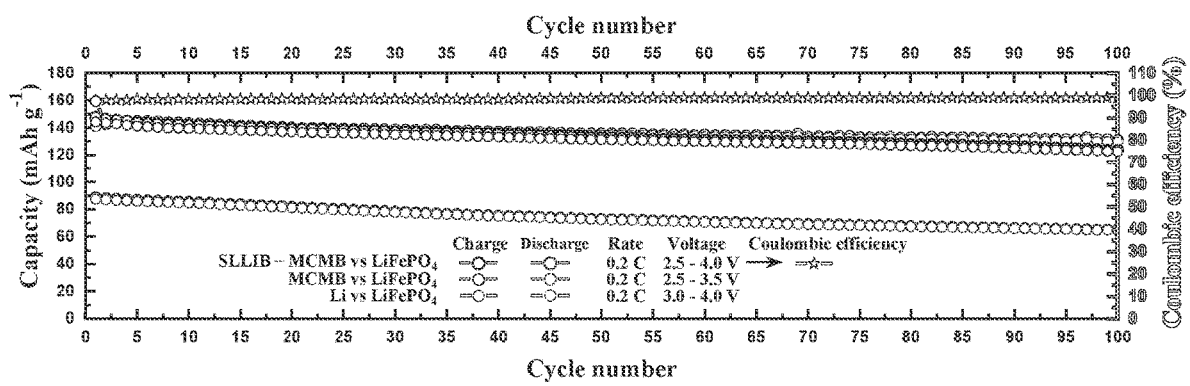
FIG. 3F graphically illustrates capacity vs. cycle number for a synchronized lithium and lithium-ion battery, conventional full cell, and half-cell for the charge-discharge cycle studies.
Figure 9A:
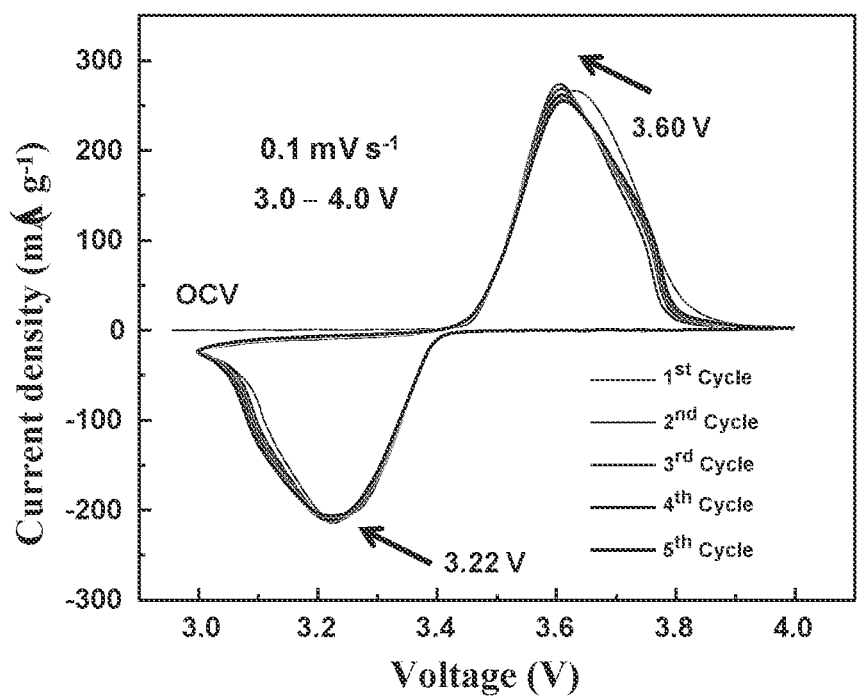
FIG. 9A graphically illustrates cyclic voltammograms of Li vs. LiFePO$_4$ for the first five cycles.
Figure 9B:
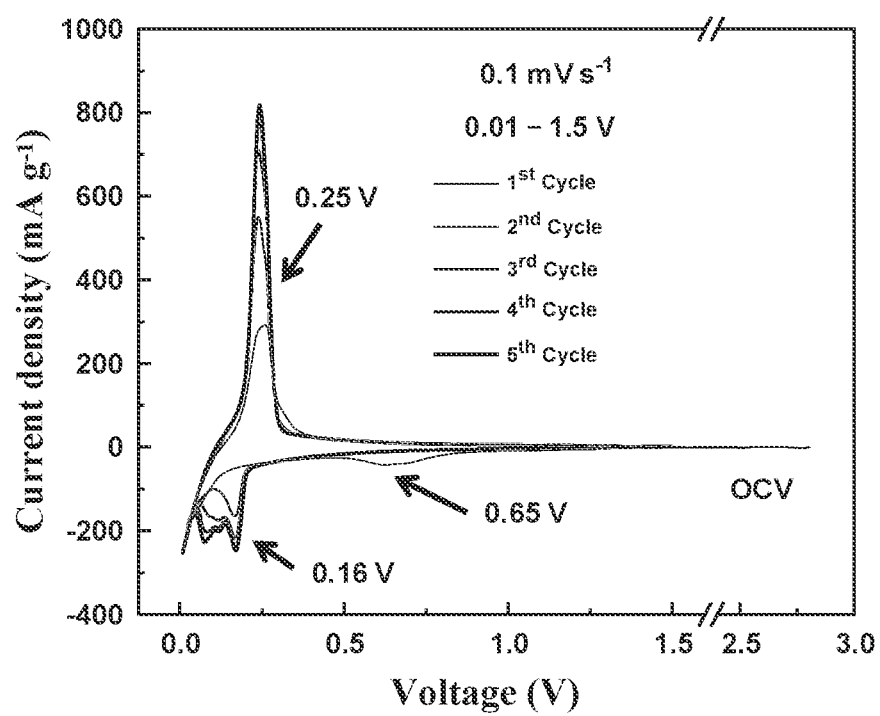
FIG. 9B graphically illustrates cyclic voltammograms of Li vs. MCMB for the first five cycles.
Figure 10A:
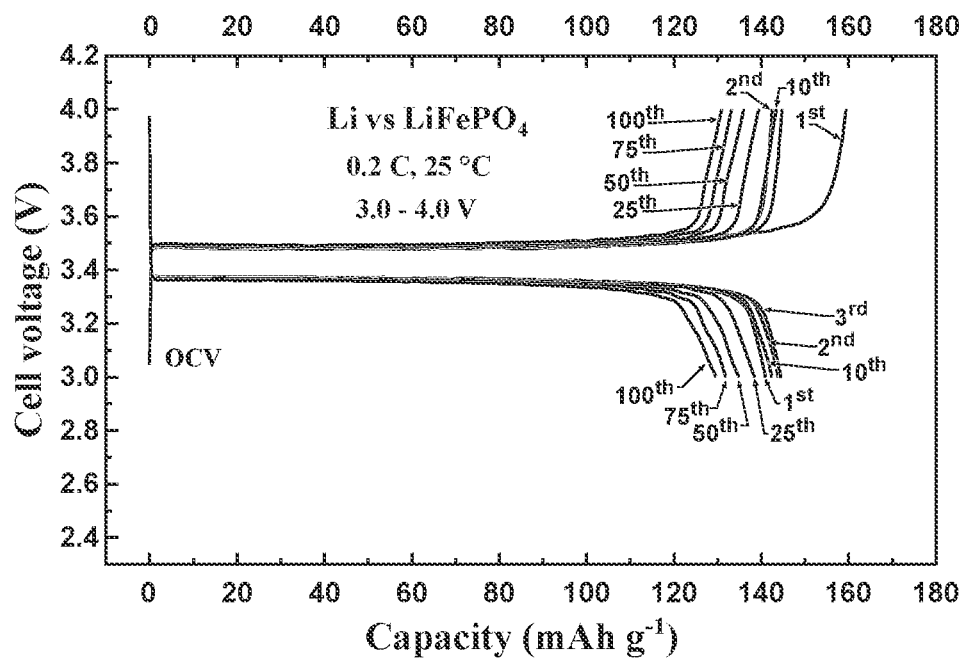
FIG. 10A graphically illustrates cell voltage vs. capacity of Li vs. LiFePO$_4$ half-cell for 100 cycles.
Figure 10B:
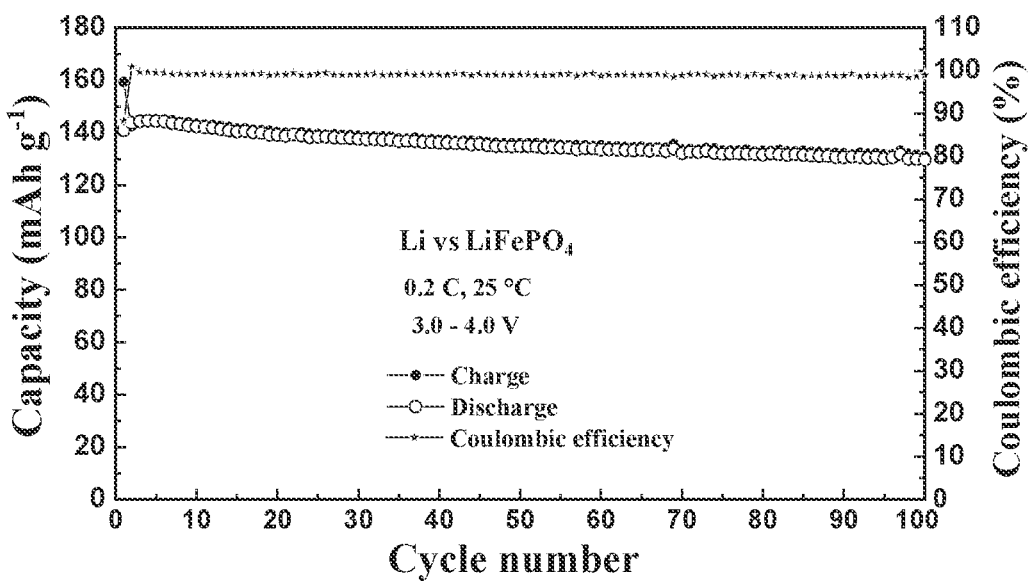
FIG. 10B graphically illustrates capacity vs. cycle umber and cycle number vs. Coulombic efficiency for Li vs. LiFePO$_4$.
Figure 11A:
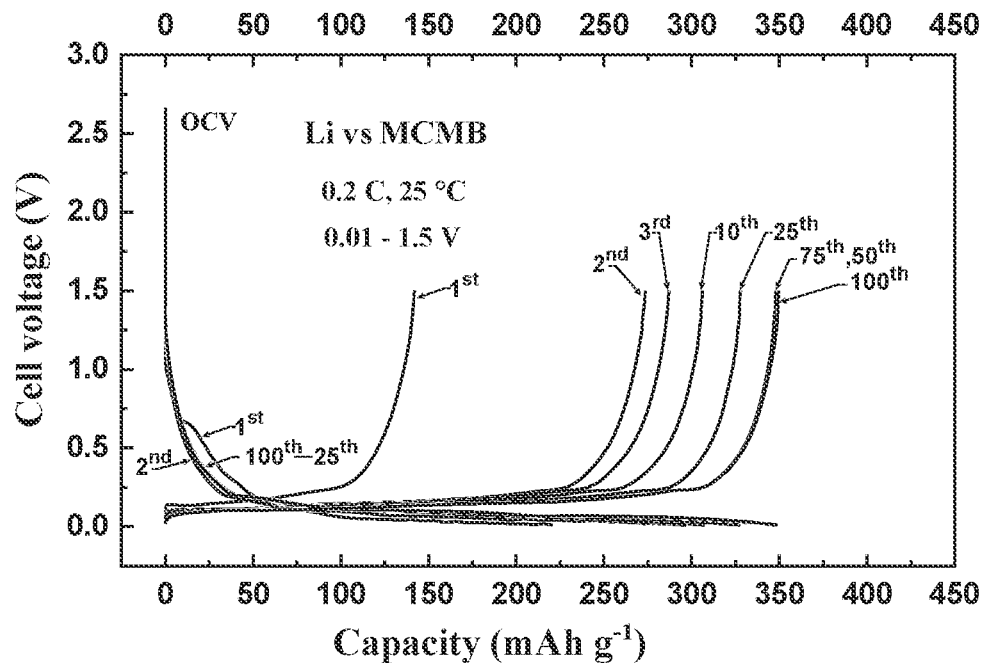
FIG. 11A graphically illustrates cell voltage vs. capacity of Li vs. MCMB half-cell for 100 cycles.
Figure 11B:
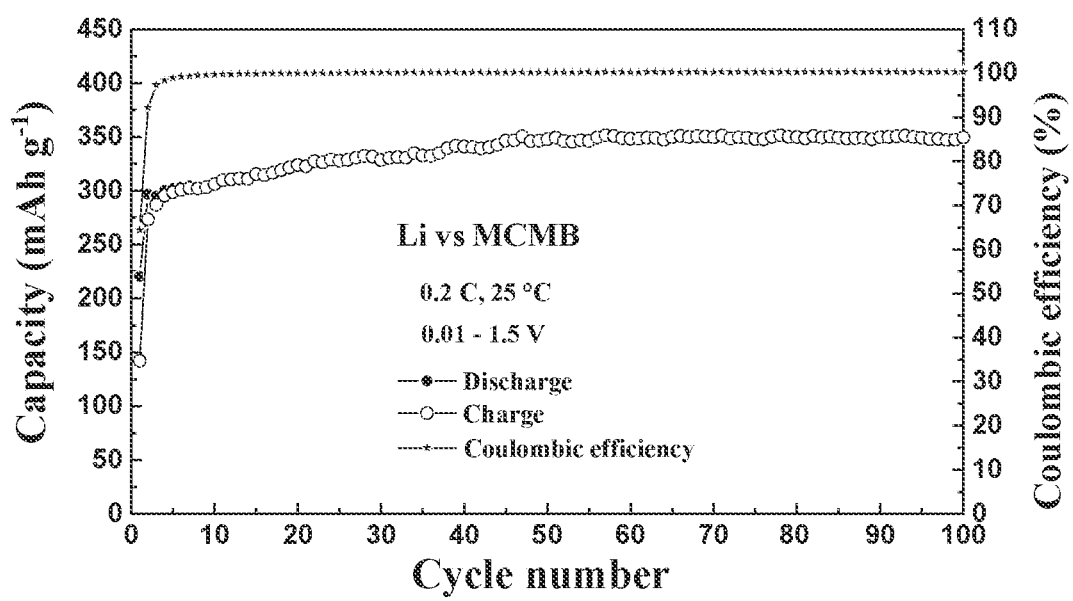
FIG. 11B graphically illustrates capacity vs. cycle umber and cycle number vs. Coulombic efficiency for Li vs. MCMB.
Figure 12:
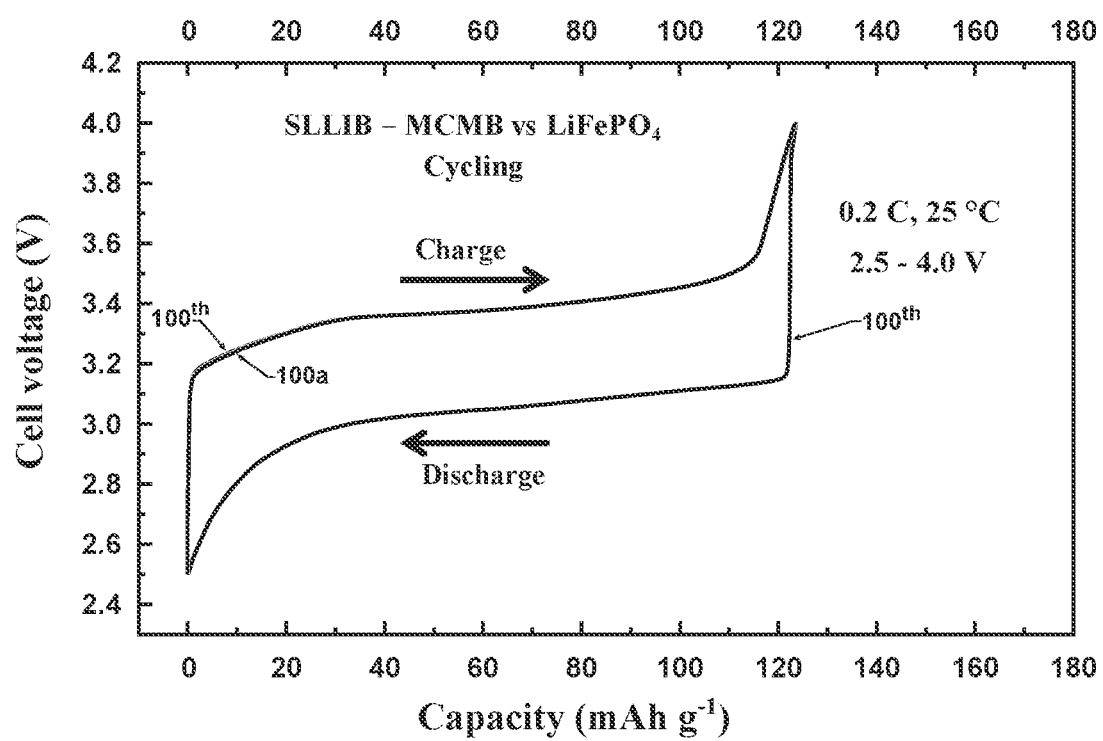
FIG. 12 graphically illustrates cell voltage vs. capacity of MCMB vs. LiFePO$_4$ for 100 cycles.

Synchronized Lithium and Lithium-Ion Battery Performance with Renewed Electrode Characteristics The replenished synchronized cell enabled to replenished cycling (SLLIB-MCMB vs $LiFePO_4$) charge-discharge cycling studies as shown in FIG. 3A between MCMB vs $LiFePO_4$ at 0.2 C. It is noteworthy that the charge voltage profile at 0.2 C appeared as an incomplete process corresponding to the cut-off limit of 2.5-3.5 V. For this reason, upcoming cycling studies were carried out between 2.5-4.0 V as depicted in FIG. 3B. The obtained voltage profiles between 2.5-4.0 V were associated with complete intercalation/de-intercalation process, yielding charge-discharge capacities 147/145 mAh $g^{-1}$ and comparable to with the charge-discharge capacities of 136/133 mAh $g^{-1}$ obtained between 2.5-3.5 V at 0.2 C rate. The renewed flat-voltage profiles at 3.4 and 3.2 V corroborated with the pronounced oxidation and reduction peaks appearing at 3.6/3.22 V for $LiFePO_4$ cathode and 0.25/0.16 V for MCMB anode at 0.1 mV $S^{-1}$ in potentiostatic cyclic voltammetric half-cell studies as illustrated in FIGS. 9A, 9B. The attained stable cycling flat-voltage profile of the synchronized cell associated with the half-cell cycling performance of $LiFePO_4$ (FIGS. 7A, 7B) and MCMB electrodes (FIGS. 8A, 8B) exhibiting flat-voltage profiles. Indeed, the delivered charge-discharge capacity of 147/145 mAh $g^{-1}$ for the synchronized cell was higher than those of conventional full-cell (MCMB vs $LiFePO_4$) charge-discharge capacity 88/86 mAh $g^{-1}$ having slope-voltage profile (FIG. 3C) and closer to $LiFePO_4$ half-cell results 142/143 mAh $g^{-1}$ at 0.2 C as compared in FIG. 3D. Considerably, the slightly decreased voltage profile of synchronized cell from the half-cell voltage related to MCMB anode voltage, involved in the electrochemical cell reaction. Moreover, the discharge energy density 455 Wh $Kg^{-1}$ of tri-electrode full-cell was higher an almost two-fold increase over the conventional full-cell energy density 275 Wh $Kg^{-1}$ as shown in FIG. 3E. With this enhancement, the galvanostatic cycling performance of SLLIB-MCMB vs $LiFePO_4$, MCMB vs $LiFePO_4$ and Li vs $LiFePO_4$ cells were carried out for 1-100 cycles and compared in terms of capacity vs cycle number as presented in FIG. 3F. From the results, the charge-discharge capacities of synchronized cell at $1^{st}$ and $100^{th}$ cycles were 147/145 mAh $g^{-1}$ and 123/122 mAh $g^{-1}$ respectively. It is pertinent to note that the performance of the synchronized cell exhibited gradual capacity fading upon cycling with the capacity retention of 84% and coulombic efficiency of 99% at $100^{th}$ cycle. Still, the delivered capacity at $100^{th}$ cycles were almost two-fold higher than conventional full-cell (MCMB vs $LiFePO_4$) charge-discharge capacities 65/64 mAh $g^{-1}$ and achieved closer to 125/124 mAh $g^{-1}$ at $100^{th}$ cycle for Li vs $LiFePO_4$ half-cell performance as represented in FIG. 3F. Clearly, it is reasonable to infer that the two-fold capacity enhancement of synchronized lithium and lithium-ion battery is attributed by reservoir replenishing for SEI $Li^+$ ion consumption.

Figure 4A:
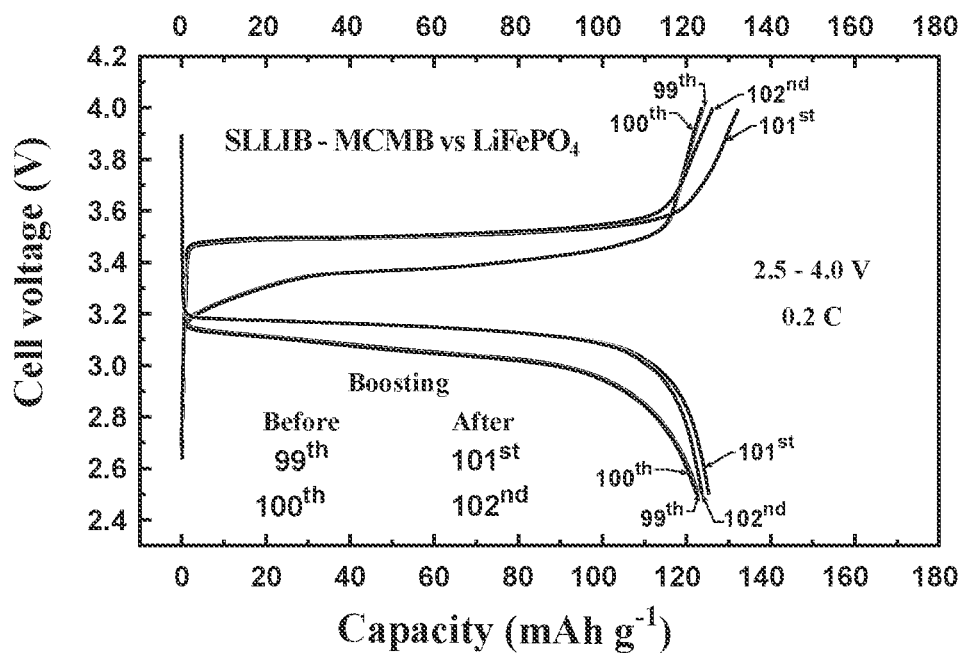
FIG. 4A graphically illustrates cell voltage vs. capacity for a synchronized lithium and lithium-ion battery during $99^{th}$, $100^{th}$, $101^{st}$, and $102^{nd}$ cycles.
Figure 4B:
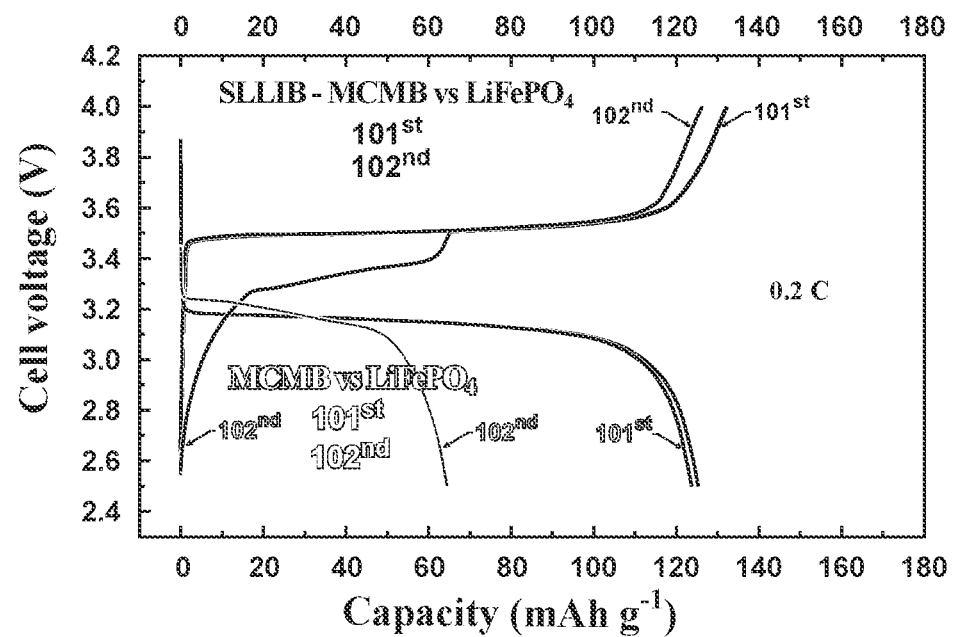
FIG. 4B graphically illustrates cell voltage vs. capacity for a synchronized lithium and lithium-ion battery and a full-cell during $101^{st}$ and $102^{nd}$ cycles.
Figure 4C:
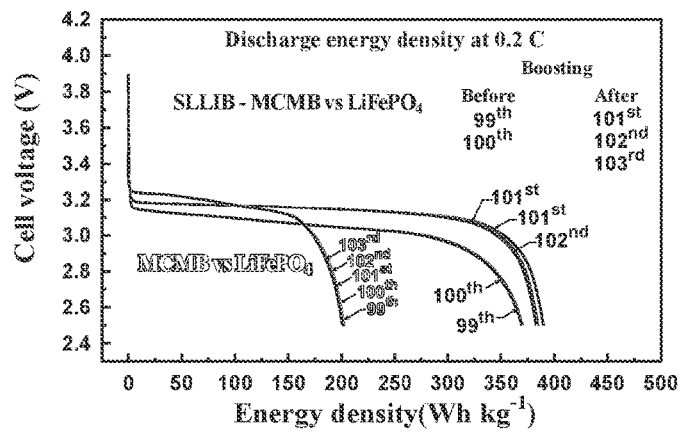
FIG. 4C graphically illustrates cell voltage vs. energy density for a synchronized lithium and lithium-ion battery and a full-cell during $99^{th}$, $100^{th}$, $101^{st}$ and $102^{nd}$ cycles.
Figure 4D:
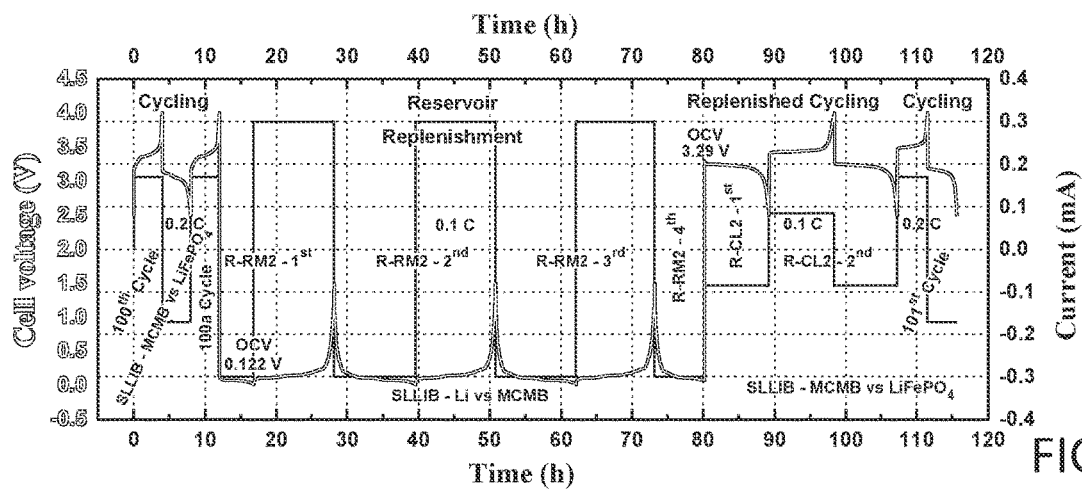
FIG. 4D graphically illustrates cell voltage vs. time for a synchronized lithium and lithium-ion battery operated sequentially in the conventional cycling, reservoir replenishment, and replenished cycling operations over the $100^{th}$ and $101^{st}$ cycles.
Figure 4E:
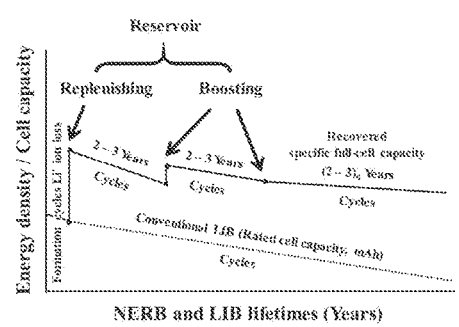
FIG. 4E graphically illustrates energy density/cell capacity over time for a synchronized lithium and lithium-ion battery and a full-cell lithium ion battery.
Figure 4F:
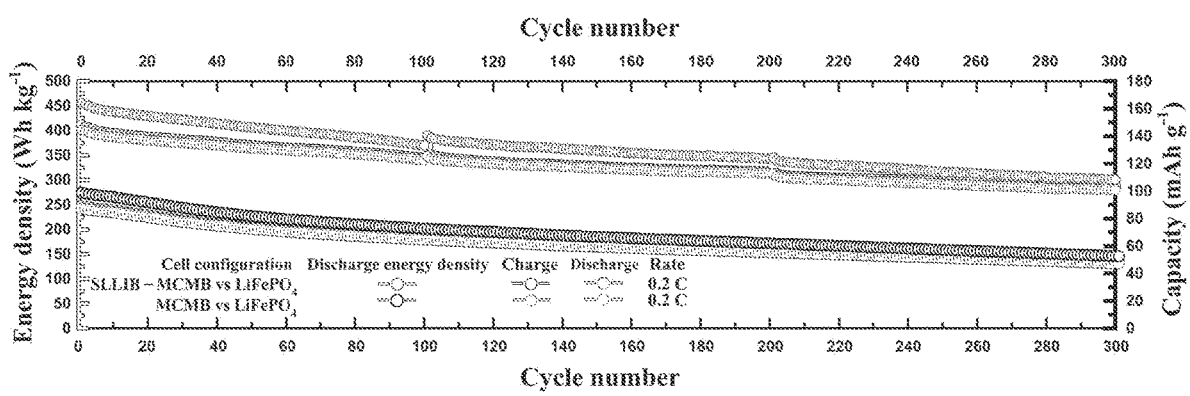
FIG. 4F graphically illustrates energy density over cycle number for a synchronized lithium and lithium-ion battery and a conventional full-cell battery.

In Situ Reservoir Replenishment Repeated for Longer-Lasting Rechargeable Batteries The charge-discharge cycling studies of SLLIB-MCMB vs $LiFePO_4$ showed depletion of $Li^+$ ions and recovered by an additional in situ reservoir replenishment process, represented with the sloping voltage profile for $99^{th}/100^{th}$ cycles as compared to the $101^{st}/102^{nd}$ cycle at 0.2 C rate between 2.5-4.0 V, as shown in FIG. 4A. The obtained charge-discharge capacities 132/125 mAh $g^{-1}$ are two-fold higher with recovered stable flat-voltage profile than conventional Li-ion full-cell, having slope-voltage profile and charge-discharge capacities 65/64 mAh $g^{-1}$ at $101^{st}$ cycles (FIG. 4B). The increased discharge energy density 390 Wh $Kg^{-1}$ at $101^{st}$ cycle than 369 Wh $Kg^{-1}$ at $100^{th}$ cycle corresponding to the $2^{nd}$ reservoir replenishment (R-RM2) process for depleted $Li^+$ ions during charge-discharge cycles (1-100). The obtained discharge energy density 390 Wh $Kg^{-1}$ was almost two-fold higher than conventional energy density 201 Wh $Kg^{-1}$ at $101^{st}$ cycle as shown in FIG. 4C. The increased discharge energy density 390 Wh $Kg^{-1}$ at $101^{st}$ cycle over that of 369 Wh $Kg^{-1}$ at $99/100^{th}$ cycle corresponds the $2^{nd}$ reservoir replenishment (R-RM2) process of SLLIB-Li vs MCMB and $2^{nd}$ replenished cycling (R-CL2) of SLLIB-MCMB vs $LiFePO_4$, as illustrated in FIG. 4D. The R-RM2 process was preceded by complete $Li^+$ ion de-intercalation from the $LiFePO_4$ cathode through conventional cycling process of SLLIB-MCMB vs $LiFePO_4$ at 0.2 C (2.5-4.0 V) with $100^{th}$ (123/122 mAh $g^{-1}$) and $100a^{th}$ cycle (123 mAh $g^{-1}$), having only charge process as given in FIGS. 4D and 12. Consequently, the R-RM2 process Li vs MCMB has been performed for 4 cycles with an initial partial discharge capacity 168 mAh $g^{-1}$ (R-RM2-0), started at 0.122 V (OCV). In the R-RM2-process, the SLLIB-Li vs MCMB yielded the stable discharge-charge capacities of 398/391 mAh $g^{-1}$ for R-RM2-$2^{nd}$ to R-RM2-$3^{rd}$, corroborated with MCMB half-cell studies at 0.1 C between 0.01-1.5 V, given in FIGS. 8A-8B. Then, the $4^{th}$ cycle (R-RM2-$4^{th}$) limited with the discharge capacity 247 mAh $g^{-1}$ with respect to synchronized cell performance. With the refreshed intercalated $Li^+$ ions into MCMB anode, the R-CL2 process (SLLIB-MCMB vs LiFePO$_4$) started at 3.29 V (OCV) between MCMB and LiFePO$_4$ cathode, and delivered the charge-discharge capacities 142/137 mAh g$^{-1}$ (R-CL2-2$^{nd}$, 0.1 C) and 132/125 mAh g$^{-1}$ (101$^{st}$, 0.2 C) with the stable flat-voltage profile. As discussed in half-cell studies, during cycling the internal resistance of pristine LiFePO$_4$ cathode are increased and revealed with higher polarization between charge-discharge cycling profiles of synchronized cell for 1$^{st}$ and 101$^{st}$ cycles (FIGS. 3A-3B and 4A) related to considerable enhanced performance by the R-RM2 process. We performed the R-RM2 process using synchronized cell configuration and repeated for n-number of terms to minimize the capacity fade and enhanced capacity retention for extended battery lifetimes towards long lasting rechargeable batteries as schematized in FIG. 4E. The observed cycling performance has compared between the synchronized full-cell (SLLIB-MCMB vs LiFePO$_4$) and conventional full-cell (MCMB vs LiFePO$_4$) with respect to discharge energy density and cell specific capacity as given in FIG. 4F. As predicted, repeated replenishment processes were facilitated to reduce the capacity fade and enhanced capacity retention as demonstrated between 200-300 cycles for synchronized lithium and lithium-ion battery than conventional full-cell (MCMB vs LiFePO$_4$) showed continuous capacity fade during cycling as depicted in FIG. 4F. From the obtained results, it is clear that the synchronized lithium and lithium-ion battery performance in terms of discharge energy density 343 Wh Kg$^{-1}$ and specific charge-discharge capacities 114/113 mAh g$^{-1}$ was superior to conventional full-cell performance 171 Wh Kg$^{-1}$ and 56/55 mAh g$^{-1}$ at 0.2 C for 200$^{th}$ cycle. The present technology addressed the issue of SEI Li$^+$ ion loss for full-cell (MCMB vs LiFePO$_4$. In view of this, the achieved higher performance by reservoir replenishment and replenished cycling establishes the synchronized lithium and lithium-ion battery as a practically 'long lasting' rechargeable battery with a much more stable cycling performance than the conventional full-cell. Thus, the the synchronized lithium and lithium-ion battery may be considered to be a 'never ending', or at least an extremely long lived, rechargeable battery having ample scope for EVs, HEVs and high-energy grid storage applications with extendable battery lifetimes.

Figure 5A:
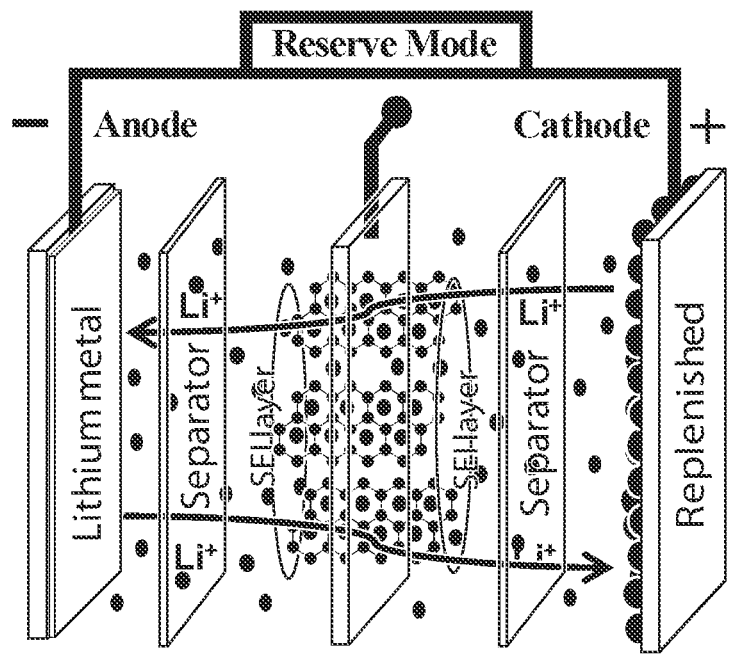
FIG. 5A schematically illustrates the synchronized lithium and lithium-ion battery of FIG. 1A switched for a reservoir reserve mode operation.
Figure 5B:
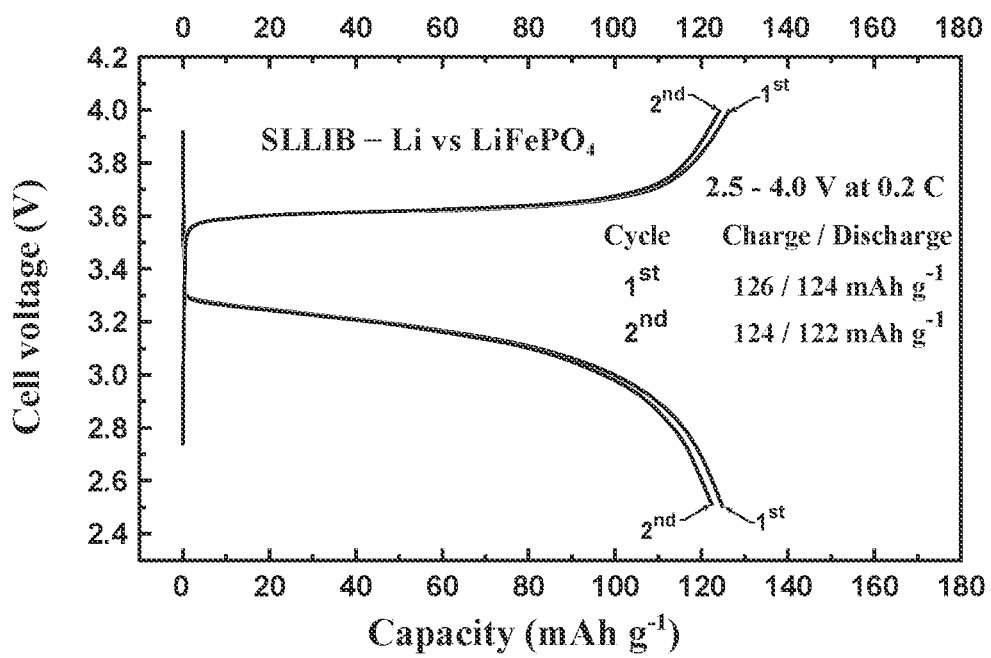
FIG. 5B graphically illustrates cell voltage vs. capacity for the cell of FIG. 5A cycled over two cycles.

Reservoir Reserve Mode Cycling and Confirmation of Li$^+$ Ion Diffusion Pathways Further, when the LIBs are used in specialized applications, the reserve mode cycling enables the issue of unexpected cell failure mechanism to be addressed. This, occurs either by SEI rupture, or full-cell over charging/discharging process or after extensive cycling. For applications, the unexpected failure prevention is critical, the synchronized lithium and lithium-ion battery would be preferred for the reserve mode operation involved, such as in space, medical and high-power applications. Hence, the reserve mode cycling process was examined (SLLIB-Li vs LiFePO$_4$) at 0.2 C between 2.5-4.0 V as shown in FIG. 5A. It can be seen that the reserve mode cycling process delivered the charge-discharge capacities of 126/124 mAh g$^{-1}$ and 124/122 mAh g$^{-1}$ for first and second cycles (FIG. 5B).

Figure 5C:
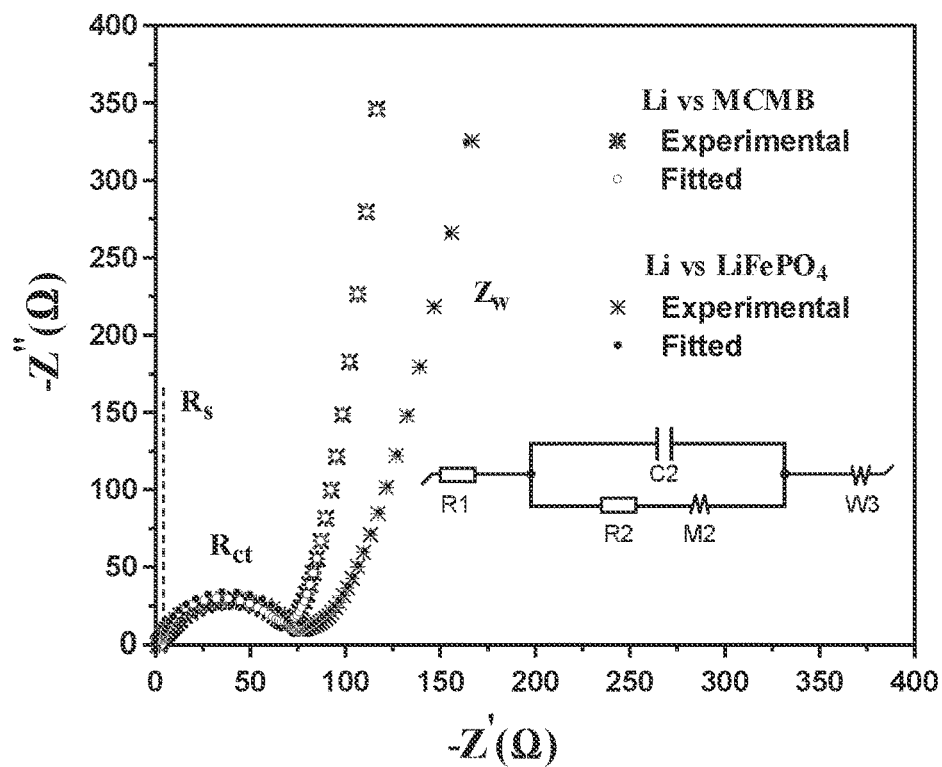
FIG. 5C graphically illustrates experimental and fitted Nyquist plots for Li vs. MCMB and Li vs. LiFePO$_4$ half-cells.
Figure 5D:
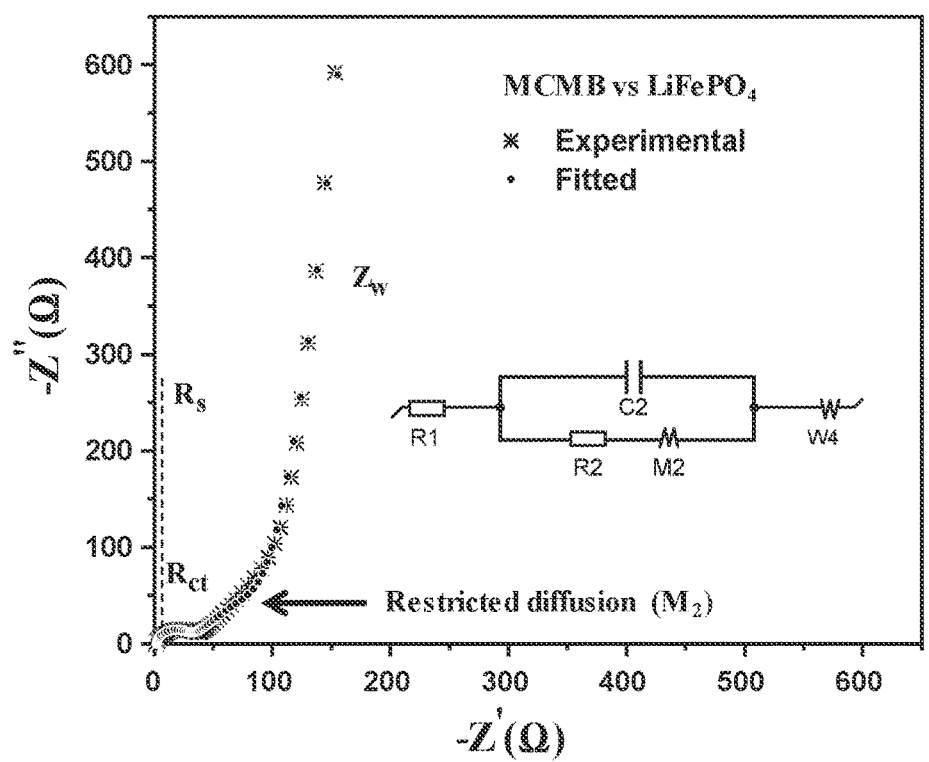
FIG. 5D graphically illustrates experimental and fitted Nyquist plots for MCMB vs. LiFePO$_4$ full cells.
Figure 5E:
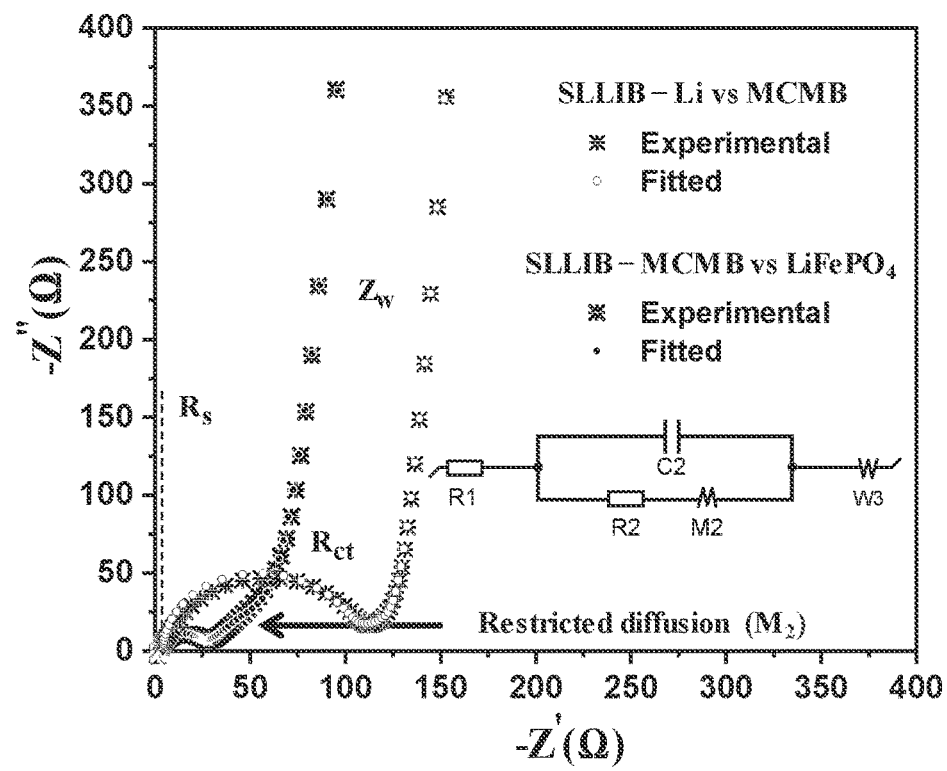
FIG. 5E graphically illustrates experimental and fitted Nyquist plots for synchronized lithium and lithium-ion battery for Li vs. MCMB and MCMB vs. LiFePO$_4$.
Figure 5F:
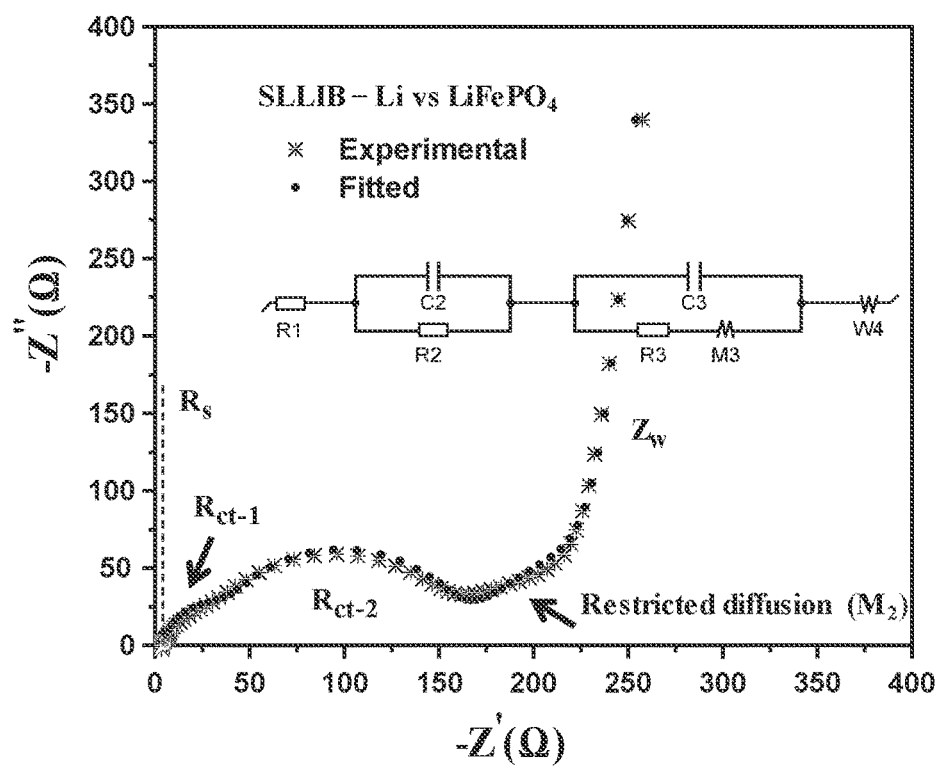
FIG. 5F graphically illustrates experimental and fitted Nyquist plots for synchronized lithium and lithium-ion battery for Li vs. LiFePO$_4$.

The discharge step shows a slightly slanting-voltage profile corresponding to the presence of a diffusion barrier for Li$^+$ ion transportation between the reservoir-electrode and the LiFePO$_4$ cathode. Therefore, the kinetic characteristics of intercalation/de-intercalation may be examined by electrochemical impedance spectroscopic (EIS) technique for half-cell, conventional full-cell and synchronized lithium and lithium-ion battery, as given in FIGS. 5C-F. The obtained Nyquist plots(experimental indicated in asterisk) were fitted (indicated in circle) with the equivalent circuit components (see FIG. 5). The Nyquist plot for Li vs MCMB and Li vs LiFePO$_4$ half-cells shows similar high frequency semicircle ($R_{ct}$~75Ω; combination of $R_2$ and $Rd_2$) and low frequency Warburg $Z_w$ process attributed to high semi-infinite linear diffusion (FIG. 5C). It can be seen that the conventional full-cell (MCMB vs LiFePO$_4$) EIS profile exhibits reduced $R_2$~25Ω and increased restricted diffusion $Rd_2$~131Ω (denoted in $M_2$) as shown in FIG. 5D. Significantly, the synchronized lithium and lithium-ion battery EIS profiles of SLLIB-Li vs MCMB and SLLIB-Li vs LiFePO$_4$ (FIG. 5E) shows analogous Nyquist plot related to MCMB half-cell and conventional MCMB vs LiFePO$_4$ full-cell, comprising high frequency semicircle and low frequency Warburg process $Z_w$ with the fitted equivalent circuit $R_1+C_2/(R_2+M_2)+W_3$. It can be seen that the EIS profile of TE-Li vs LiFePO$_4$ (FIG. 5F) exhibited two semicircles at high frequency region and dominant restricted diffusion ($Rd_3$~180Ω), appearing along with low frequency Warburg process $Z_w$. The entire impedance profile fitted with the equivalent circuit $R_1+C_2/R_2+C_3/(R_3+M_3)+W_4$, having higher $R_{ct}$~230Ω corresponding to the additional resistor and capacitor. The additional resistance $R_3$~112Ω and capacitance $C_3$~11.44×10$^{-6}$ may be attributed to the presence of MCMB electrode, presented as a diffusion barrier between reservoir and LiFePO$_4$ cathode. This confirms that Li$^+$ ion transportation between reservoir and LiFePO$_4$ cathode through the MCMB electrode for reserve mode cycling of the synchronized lithium and lithium-ion battery. The warranted characteristics of reservoir replenishment, replenished cycling and reserve mode cycling operations are permitting the synchronized lithium and lithium-ion battery to approach 'long lasting' recharging battery. Therefore, synchronized cell have ample scope for the Li-ion, Na-ion and K-ion batteries in large-scale energy storage applications.

The novel synchronized lithium and lithium-ion battery (Li vs MCMB vs LiFePO$_4$) yields an extremely long lived rechargeable battery, taking advantage to renewed electrode characteristics through reservoir replenishment, replenished cycling and reserve mode cycling processes comprising conventional cycling (SLLIB-MCMB vs LiFePO$_4$), reservoir replenishment (SLLIB-Li vs MCMB), replenished cycling (SLLIB-MCMB vs LiFePO$_4$) and reserve mode cycling (SLLIB-Li vs LiFePO$_4$) steps. By employing an inbuilt lithium reservoir-electrode, the intercalation and deintercalation of the lithium-ion battery may be successfully tuned to stimulate lithium regeneration and thus extend the battery lifetime. The inbuilt booster-electrode may be enabled to compensate for 45% Li$^+$ ion loss as consumed in initial formation cycles, and to yield virtually 100% recovered charge-discharge capacities (147/145 mAh g$^{-1}$) with a stable flat-voltage profile for synchronized lithium and lithium-ion battery analogous to half-cell results (145/144 mAh g$^{-1}$) at 0.2 C. Consequently, higher discharge energy density 455 Wh Kg$^{-1}$ may be achieved for a cell with a LiFePO$_4$ cathode used in synchronized lithium and lithium-ion battery than conventional full-cell 275 Wh Kg$^{-1}$. Particularly at the 200$^{th}$ cycle, two-fold increased discharge energy density 343 Wh Kg$^{-1}$ (114/113 mAh g$^{-1}$) was obtained for synchronized lithium and lithium-ion battery than conventional full-cell, and exceeding energy density 171 Wh Kg$^{-1}$ (56/55 mAh g$^{-1}$). The repeated reservoir replenishment process may be facilitated for minimized capacity fade and enhanced capacity retention in a Li-ion full-cell. Likewise, the issue of unexpected cell failure mechanism is addressed, the reserve mode cycling process has also been performed and obtained the charge-discharge capacities of 126/124 mAh g$^{-1}$ at 0.2 C related to Li$^+$ ion transportation from reservoir-electrode to LiFePO$_4$ and confirmed with the Li$^+$ ion diffusivity by EIS measurement. From these results, the novel synchronized lithium and lithium-ion battery advances the goal of creating a virtually 'never ending' rechargeable batteries having ample scope for EVs, HEVs and high-energy grid storage applications with extendable battery lifetimes.

Methods

Materials and Characterization

Li-ion battery commercial-grade MCMB and LiFePO$_4$ materials (MSE supplies) were preheated at 120° C. in a vacuum oven for 24 h and used with the preliminary characterization studies. Notably, the physical properties that phase purity and crystallinity of LiFePO$_4$ and MCMB materials were investigated by powder X-ray diffraction analysis, recorded in 2θ, range between 10-80° using Rigaku diffractometer with Cu Kα X-ray source. To confirm the presence of elements in MCMB and LiFePO$_4$ materials, the morphology and elemental mapping were examined with energy dispersive X-ray analysis via scanning electron microscopy. Further, particle agglomerations and size were inspected by high-resolution scanning electron microscopy.

Electrode Preparation

CR-2032 coin type cell configuration was used with LiFePO$_4$ cathode (single side) and MCMB anodes (single side and double side). Single side electrodes of LiFePO$_4$ and MCMB were fabricated by doctor-blade coating process using vacuum provided MTI laminate coater. The electrode slurry contained 80% active material, 10% Super carbon and 10% PVdF dissolved in N-methyl-2-pyrrolidone (NMP), homogenized by thinky planetary mixture, coated on aluminum foil (12 μm, thickness) for LiFePO$_4$ cathode and copper foil (9 μm, thickness) for MCMB anode. The coated electrodes were dried at 80° C. in a vacuum oven for 12 h and roll pressed. The calendared LiFePO$_4$/MCMB electrodes were punched with the average active material loading mass of ~5.5/2.8 mg in 14 mm diameter. Then, the lithium metal foil with the loading weight of 12 mg and 14 mm diameter was used as reference electrode for half-cell studies as well as represented as a reservoir-electrode for reservoir replenishment, replenished cycling and reserve mode cycling in synchronized lithium and lithium-ion battery. Significantly, the double sided MCMB anode was fabricated with the capability of Li$^+$ ion diffusion through the electrode, prepared by MCMB film connected with copper mesh. The double sided MCMB anode had a disc shape (14 mm diameter) with the active material loading mass of ~8.5 mg and used in the synchronized lithium and lithium-ion battery.

Cell Assembly

In order to evaluate the electrochemical performance, the fabricated electrodes were used to assemble half-cells (Li vs LiFePO$_4$ and Li vs MCMB), conventional full-cell (MCMB vs LiFePO$_4$) and synchronized lithium and lithium-ion battery (Li vs MCMB vs LiFePO$_4$) with the CR-2032 cell configuration. Lithium half-cells of LiFePO$_4$ cathode and MCMB anode made-up by lithium metal foil (~1 mm thickness were) used as reference. Further, conventional Li-ion full-cell MCMB vs LiFePO$_4$ was assembled with the electrode mass ratio of negative and positive ~1:2 (MCMB/LiFePO$_4$) using 1 M LiPF$_6$ electrolyte contains mixture of EC-DEC in 1:1 (v/v ratio) and polypropylene separator. The synchronized lithium and lithium-ion battery was fabricated using LiFePO$_4$ cathode, double sided MCMB anode and reservoir-electrodes, externally connected with smart-grid line circuit and internally separated by polypropylene separator with 1 M LiPF$_6$ electrolyte in EC-DEC (1:1, v/v). The double sided MCMB anode placed in between LiFePO$_4$ cathode and reservoir-electrode to facilitate Li$^+$ ion diffusion between LiFePO$_4$ cathode and reservoir-electrode related to the intercalation and deintercalation process involved in the charge-discharge process preceded by conventional cycling (SLLIB-MCMB vs LiFePO$_4$), reservoir replenishment (SLLIB-Li vs MCMB), replenished cycling (SLLIB-MCMB vs LiFePO$_4$) and reserve mode (TE-Li vs LiFePO$_4$) cycling process. All the electrochemical non-aqueous cells (half-cell, conventional full-cell and synchronized lithium and lithium-ion battery) were assembled using argon-filled glove-box with oxygen and moisture levels controlled at less than 0.5 ppm.

Electrochemical Measurements

The fabricated cells were used in electrochemical characterization techniques such as electrochemical impedance spectroscopic measurement (EIS), cyclic voltammograms (CV) and galvanostatic charge-discharge studies. Accordingly, EIS analysis was performed in the frequency range 1 MHz to 100 mHz to determine the kinetic characteristics of Li$^+$ ion intercalation/de-intercalation and Li$^+$ ion diffusion path through the electrode. Consequently, to confirm the Faradaic redox reaction corresponding to the full-cell voltage, CV was recorded to the fabricated half-cells at 0.1 mV s$^{-1}$ in the voltage range 3.0 to 4.0 V (LiFePO$_4$ cathode) and 0.01 to 1.5 V (MCMB anode) for 1-5 cycles. Eventually, galvanostatic charge-discharge studies have been carried out to all the fabricated cells using Arbin cycler at 25° C. with different voltage window and rates with respect to designed cell configuration. Thus, the Li vs LiFePO$_4$ and Li vs MCMB half-cells were cycled between 3.0 to 4.0 V (LiFePO$_4$ cathode) and 0.01 to 1.5 V (MCMB anode) respectively, at 0.1 C and 0.2 C rates. Subsequently, the conventional full-cell cycling studies were carried out in the voltage range 2.5 to 3.5 V at 0.06 C and 0.2 C rates. More importantly, the synchronized lithium and lithium-ion battery charge-discharge cycling studies were performed by conventional cycling (SLLIB-MCMB vs LiFePO$_4$), reservoir replenishment (SLLIB-Li vs MCMB), replenished cycling (SLLIB-MCMB vs LiFePO$_4$) and reserve mode (SLLIB-Li vs LiFePO$_4$) cycling process with wide cell voltage range 0.01 to 4 V at different rates (0.06 C, 0.1 C and 0.2 C).

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of producing a lithium ion battery, comprising:
   a) spacing a first electrode from a second electrode to define a first battery space therebetween;
   b) placing a first volume of lithium ion conducting electrolyte in the first battery space;

c) spacing a third electrode from the first electrode to define a second battery space therebetween; and
d) placing a second volume of lithium ion conducting electrolyte in the second battery space;
e) connecting a switch in electric communication between the first and third electrodes;
f) connecting a first switch in electric communication with the first electrode and the third electrode;
g) connecting a second switch in electric communication with the first electrode and the second electrode;
h) operating the lithium ion battery with the first switch open and the second switch closed, wherein the first electrode is an anode and the second electrode is a cathode;
i) after h), operating the lithium ion battery with the first switch closed and the second switch open, wherein the first electrode is a cathode and the third electrode is an anode; and
j) after i), operating the lithium ion battery with the first switch closed and the second switch open, wherein the first electrode is an anode and the second electrode is a cathode;

wherein the third electrode is a lithium reservoir.

2. The method of claim 1 wherein lithium is replenished on the second electrode during j).

3. The method of claim 1 wherein the lithium ion battery does not experience voltage degradation over at least 100 cycles.

4. The method of claim 1 wherein the lithium ion battery does not experience voltage degradation over at least 200 cycles.

5. The method of claim 1 wherein the cathode does not experience lithium depletion over at least 100 cycles.

* * * * *